United States Patent
Kim et al.

(10) Patent No.: US 10,034,000 B2
(45) Date of Patent: Jul. 24, 2018

(54) METHOD, MEDIUM, AND SYSTEM ENCODING AND/OR DECODING MOVING PICTURES BY ADAPTIVELY APPLYING OPTIMAL PREDICTION MODES

(75) Inventors: Woo-shik Kim, Yongin-si (KR);
Hyun-mun Kim, Yongin-si (KR);
Dae-sung Cho, Yongin-si (KR); Dmitri Birinov, Yongin-si (KR); Dae-hee Kim, Yongin-si (KR); Woong-il Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1079 days.

(21) Appl. No.: 11/717,208

(22) Filed: Mar. 13, 2007

(65) Prior Publication Data
US 2007/0211797 A1 Sep. 13, 2007

Related U.S. Application Data

(60) Provisional application No. 60/781,379, filed on Mar. 13, 2006.

(30) Foreign Application Priority Data

May 30, 2006 (KR) .................. 10-2006-0049080

(51) Int. Cl.
*H04L 29/06* (2006.01)
*H04N 19/136* (2014.01)
(Continued)

(52) U.S. Cl.
CPC .......... *H04N 19/136* (2014.11); *G06T 9/007* (2013.01); *H04N 19/103* (2014.11);
(Continued)

(58) Field of Classification Search
CPC ...... H04N 200/243; H04N 19/00; H04N 7/52; G09G 5/393; G06F 9/30145
(Continued)

(56) References Cited

U.S. PATENT DOCUMENTS

| 5,038,216 A | * | 8/1991 | Easterly et al. ............. 348/364 |
| 5,667,735 A | | 10/1997 | Ueno et al. |

(Continued)

FOREIGN PATENT DOCUMENTS

| CN | 1574970 | 2/2005 |
| EP | 1 478 189 | 11/2004 |

(Continued)

OTHER PUBLICATIONS

Woo-Shik Kim et al., "Enhancement to RGB coding in H.264/MPEG-4 AVC FRExt", ITU-Telecommunications Standardization Sector, Study Group 16 Question 6, Video Coding Expert Group (VCEG), 26$^{th}$ Meeting: Busan, KR, Apr. 16-22, 2005, pp. 15-29.

(Continued)

*Primary Examiner* — Joseph P Hirl
*Assistant Examiner* — Leynna Truvan
(74) *Attorney, Agent, or Firm* — Staas & Halsey LLP

(57) ABSTRACT

A method, medium, and system encoding and/or decoding a moving picture. The moving picture encoding method may include selecting a prediction mode that is optimal for the macro blocks, which correspond to each other, of the color components of a current image based on the characteristics of a predetermined image, generating a predicted image for the current image according to the selected prediction mode, and encoding a moving picture using the predicted image. An optimal prediction mode can be adaptively applied to the macro blocks, which correspond to each other, of the color components, thereby increasing the moving picture's encoding and decoding efficiencies.

1 Claim, 16 Drawing Sheets

(51) Int. Cl.

| | | |
|---|---|---|
| *G06T 9/00* | (2006.01) | |
| *H04N 19/176* | (2014.01) | |
| *H04N 19/147* | (2014.01) | |
| *H04N 19/15* | (2014.01) | |
| *H04N 19/61* | (2014.01) | |
| *H04N 19/593* | (2014.01) | |
| *H04N 19/11* | (2014.01) | |
| *H04N 19/109* | (2014.01) | |
| *H04N 19/186* | (2014.01) | |
| *H04N 19/19* | (2014.01) | |
| *H04N 19/103* | (2014.01) | |
| *H04N 19/50* | (2014.01) | |

(52) U.S. Cl.
CPC ........... *H04N 19/109* (2014.11); *H04N 19/11* (2014.11); *H04N 19/147* (2014.11); *H04N 19/15* (2014.11); *H04N 19/176* (2014.11); *H04N 19/186* (2014.11); *H04N 19/19* (2014.11); *H04N 19/50* (2014.11); *H04N 19/593* (2014.11); *H04N 19/61* (2014.11)

(58) Field of Classification Search
USPC ................ D14/485; 382/162, 165, 232, 238; 385/539, 426.02, 426.04, 426.06, 448; 380/37; 386/300, 302, 353, 355, 356; 345/589, 591, 593, 597, 605; 712/208
See application file for complete search history.

(56) References Cited

U.S. PATENT DOCUMENTS

| | | | |
|---|---|---|---|
| 5,748,784 A | 5/1998 | Sugiyama | |
| 5,821,986 A * | 10/1998 | Yuan et al. | 348/14.12 |
| 6,909,749 B2 * | 6/2005 | Yang et al. | 375/240.16 |
| 7,426,308 B2 * | 9/2008 | Hsu et al. | 382/239 |
| 7,672,378 B2 * | 3/2010 | Ng et al. | 375/240.26 |
| 7,760,448 B2 * | 7/2010 | Nagata et al. | 359/814 |
| 8,488,889 B2 | 7/2013 | Moriya et al. | |
| 2004/0062445 A1 | 4/2004 | Kim et al. | |
| 2004/0101059 A1 * | 5/2004 | Joch et al. | 375/240.29 |
| 2004/0213348 A1 * | 10/2004 | Kim | H04N 19/105 375/240.12 |
| 2005/0013370 A1 * | 1/2005 | Kim et al. | 375/240.16 |
| 2005/0053151 A1 | 3/2005 | Lin et al. | |
| 2005/0053294 A1 * | 3/2005 | Mukerjee et al. | 382/236 |
| 2005/0053295 A1 | 3/2005 | Holcomb | |
| 2005/0163216 A1 | 7/2005 | Boon et al. | |
| 2005/0276493 A1 | 12/2005 | Xin et al. | |
| 2005/0281473 A1 * | 12/2005 | Kim et al. | 382/236 |
| 2006/0013320 A1 * | 1/2006 | Oguz | H04N 19/61 375/240.27 |
| 2006/0104527 A1 | 5/2006 | Koto et al. | |
| 2006/0112653 A1 | 10/2006 | Kim et al. | |

FOREIGN PATENT DOCUMENTS

| | | |
|---|---|---|
| EP | 1 507 415 A2 | 2/2005 |
| EP | 1 696 676 A2 | 8/2006 |
| JP | 05-137130 | 6/1993 |
| JP | 05-308631 | 11/1993 |
| JP | 2004-128749 | 4/2004 |
| JP | 2005-212601 | 8/2005 |
| JP | 2006-140758 | 6/2006 |
| KR | 10-2005-0067083 | 6/2005 |
| WO | WO 2006/112653 | 10/2006 |
| WO | 2007/010690 | 1/2007 |
| WO | WO 2007-010901 A1 | 1/2007 |

OTHER PUBLICATIONS

Hyun Mun Kim, "Core Experiment on Residual Color Transform (CE-8) for 4:4:4 Video", fJoint Video of Team (JVT) of ISO/IEC MPEG & ITU-T VCEG (ISO/IEC JTC1/SC29/WG11 and ITU-T SG16 Q.6), 17$^{th}$ Meeting: Nice, France Oct. 17-21, 2005, pp. 10-29.
Chinese Patent Office Action dated Mar. 22, 2010 related to Chinese Patent Application 2010031700402560.
Yu H. et al, "Advanced 4:4:4 profile" ITU Study Group 16—Video Coding Experts Group—ISO/IEC MPEG & ITU-T VCEG (ISO/IECJTC1/SC29/WG11 and ITU-T SG16 Q6), XX, XX, No. JVT-P017rl, Oct. 15, 2005, XP030006059.
Woo-Shik Kim et al, "Enhancements to RGB coding in H.264/MPEG-4 AVC FRExt", Internet Citation, Apr. 22, 2005, XP002439981, Retrieved from the Internet: URL:ftp3.itu.ch/av-arch/video-site/0504_Bus/VCEG-Z16.doc.
Extended European Search report dated Nov. 4, 2010 corresponds to European Patent Application 07715613.1.
Haoping Yu, Limin Liu, "Advanced 4:4:4 Profile for MPEG4-Part 10/H.264", Joint Video Team (JVT) of ISO/IEC MPEG & ITU-T VCEG (ISO/IECJTC1/SC29 WG 11 and ITU-T SG16 Q.6) 16 Meeting: Poznan, PL, Jul. 24-29, 2005, pp. 1-22 [JVT-P017rl].
Japanese Office Action dated Jul. 12, 2011 corresponds to Japanese patent Application No. 2009-500288.
Japanese Non-Final Rejection dated Apr. 16, 2013 in Japanese Application No. 2011-225278.
Korean Non-Final Rejection dated Mar. 11, 2013 in Korean Application No. 10-2011-0114132 (4pages) 4 pages English Translation.
Korean Non-Final Rejection dated Feb. 13, 2013 in Korean Application No. 10-2006-0049080 (5pages) 5 pages English Translation.
PCT International Search Report dated Jun. 29, 2007 in PCT International Application No. PCT/KR2007/001217.
European Summons dated Jul. 11, 2013 in related European Application No. 07715613.1.
Woo-Shik Kim et al., "Color Format Extension" Joint Video Team (JVT) of ISO/IEC MPEG & ITU-T VCEG (ISO/IEC JTC1/SC29/WG11 and ITU-T SG16 Q.6, 8$^{th}$ Meeting: Geneva, Switzerland, May 23-27, 2003, JVT-H018, pp. 1-17.
Woo-Shik Kim et al., "Study on Advanced 4:4:4 Coding", Joint Video Team (JVT) of ISO/IEC MPEG & ITU-T VCEG (ISO/IEC JTC1/SC29/WG11 and ITU-T SG16 Q.6), 16$^{th}$ Meeting: Poznañ, PL, Jul. 24-29, 2005, JVT-P049, pp. 1-8.
Extended European Search Report dated Jul. 5, 2013 in related European Application No. 12184397.3.
Korean Office Action dated Jun. 20, 2013 in related Korean Application No. 10-2006-0049080.
U.S. Office Action for co-pending U.S. Appl. No. 13/410,601; dated Sep. 25, 2013.
Japanese Office Action dated Oct. 23, 2012 in corresponding Japanese Patent Application No. 2009-500288.
Shun-ichi Sekiguchi et al., "Results of CE on Separate Predication modes for 4:4:4 coding (CE9)," Joint Video Team (JVT) of ISO/IEC MPEG & ITU-T VCEG (ISO/IEC JTC1/SC29/WG11 and ITU-T SG16 Q.6) 18$^{th}$ Meeting: Bangkok, TH, Jan. 14-20, 2006, pp. 2-29.
T. Wedi, "Intra-Only 4:4:4 Profile," 17. JVT Meeting; 74. MPEG Meeting; Oct. 14, 2005-Oct. 21, 2005; Nice, FR; (Joint Video Team of ISO/IEC JTC1/SC29/WG11 and ITU-T SG.16), No. JVT-Q086r1, Oct. 13, 2005.
Japanese Office Action dated May 22, 2012 corresponds to Japanese Patent Application No. 2009-500288.
European Office Action dated Jun. 12, 2012 corresponds to European Patent Application No. 07715613.1.
Korean Office Action for corresponding Korean Application 10-2006-0049080; dated Sep. 27, 2013.
Korean Office Action dated Aug. 8, 2012 in corresponding Korean Patent Application No. 10-2006-0049080.
Office Action dated Dec. 18, 2012 in corresponding U.S. Appl. No. 13/410,601.
U.S. Patent Office Action dated Nov. 24, 2014 in copending U.S. Appl. No. 13/410,601.
U.S. Office Action dated May 5, 2014 in co-pending U.S. Appl. No. 13/410,601.
Japanese Office Action dated Feb. 25, 2014 in corresponding Japanese Patent Application No. 2011-225278.
Japanese Appeal Decision dated Mar. 11, 2014 in corresponding Japanese Patent Application No. 2009-500288.

(56) References Cited

OTHER PUBLICATIONS

European Examination Report dated Mar. 14, 2014 in corresponding European Patent Application No. 12184397.3.
U.S. Office Action dated Dec. 7, 2015 in copending U.S. Appl. No. 13/410,601.
U.S. Office Action dated Jul. 18, 2016 in copending U.S. Appl. No. 13/410,601.
U.S. Appl. No. 14/692,176, filed Apr. 21, 2015, Woo-shik Kim et al., Samsung Electronics Co., Ltd.
U.S. Appl. No. 14/692,264, filed Apr. 21, 2015, Woo-shik Kim et al., Samsung Electronics Co., Ltd.
U.S. Appl. No. 14/692,289, filed Apr. 21, 2015, Woo-shik Kim et al., Samsung Electronics Co., Ltd.
U.S. Appl. No. 13/410,601, filed Mar. 2, 2012, Woo-shik Kim et al., Samsung Electronics Co., Ltd.
Advisory Action dated Feb. 24, 2014 in related U.S. Appl. No. 13/410,601.
Office Action dated Apr. 2, 2014 in related U.S. Appl. No. 13/410,601.
Notice of Allowance dated Jan. 11, 2017 in related U.S. Appl. No. 13/410,601.
Office Action dated Apr. 20, 2017 in related U.S. Appl. No. 14/692,176.
Office Action dated Apr. 21, 2017 in related U.S. Appl. No. 14/692,264.
Office Action dated Apr. 19, 2017 in related U.S. Appl. No. 14/692,289.
US Office Action dated Sep. 26, 2017 in U.S. Appl. No. 14/692,176.
US Office Action dated Sep. 21, 2017 in U.S. Appl. No. 14/692,264.
US Office Action dated Sep. 21, 2017 in U.S. Appl. No. 14/692,289.
Japanese Office Action dated Jun. 21, 2016 in corresponding Japanese Patent Application No. 2014-107202.
Japanese Office Action dated Jun. 21, 2016 in corresponding Japanese Patent Application No. 2014-107203.

* cited by examiner

MACRO BLOCK PARTITIONS : 16x16, 16x8, 8x16, 8x8

8x8 BLOCK PARTITIONS : 8x8, 8x4, 4x8, 4x4

METHOD, MEDIUM, AND SYSTEM ENCODING AND/OR DECODING MOVING PICTURES BY ADAPTIVELY APPLYING OPTIMAL PREDICTION MODES

CROSS-REFERENCE TO RELATED APPLICATIONS

This application claims the priority of U.S. Provisional Application No. 60/781,379, filed on Mar. 13, 2006, in the U.S. Patent and Trademark Office, and Korean Patent Application No. 10-2006-0049080, filed on May 30, 2006, in the Korean Intellectual Property Office, the disclosures of which are incorporated herein in their entirety by reference.

BACKGROUND OF THE INVENTION

1. Field of the Invention

One or more embodiments of the present invention relate to a method, medium, and system encoding and/or decoding moving pictures, and more particularly, to a method, medium, and system encoding and/or decoding moving pictures in the field of the H.264/MPEG-4 AVC (Advanced Video Coding) Fidelity Range Extensions (FRExt) standardization.

2. Description of the Related Art

A recently new RGB encoding technology called "residual color transformation" has been developed during the H.264/MPEG-4 AVC Fidelity Range Extensions (FRExt) standardization process. This technology prevents picture quality deterioration from occurring during the transformation from the RGB color space to the YCbCr color space. However, RGB encoding and decoding technologies, according to the H.264/MPEG-4 AVC FRExt standard, are not satisfactory for providing high encoding and decoding efficiencies and thus cannot be used in moving picture reproduction.

SUMMARY OF THE INVENTION

One or more embodiments of the present invention provide a method, medium, and system encoding and/or decoding moving pictures using RGB encoding technology, according to the H.264/MPEG-4 AVC (Advanced Video Coding) Fidelity Range Extensions (FRExt) standard, to provide high encoding and decoding efficiencies.

Additional aspects and/or advantages of the invention will be set forth in part in the description which follows and, in part, will be apparent from the description, or may be learned by practice of the invention.

To achieve the above and/or other aspects and advantages, embodiments of the present invention include a predicted image generating method, including selecting a prediction mode that is determined to be optimal for blocks of each color component of a current image based on characteristics of a predetermined image, and generating a predicted image for the current image according to the selected prediction mode.

To achieve the above and/or other aspects and advantages, embodiments of the present invention include at least one medium including computer readable code to control at least one processing element to implement a predicted image generating method, the method including selecting a prediction mode that is determined to be optimal for blocks of each color component of a current image based on characteristics of a predetermined image, and generating a predicted image for the current image according to the selected prediction mode.

To achieve the above and/or other aspects and advantages, embodiments of the present invention include a predicted image generating system, including a selection unit selecting a prediction mode that is determined to be optimal for blocks of each color component of a current image based on characteristics of a predetermined image, and a generation unit generating a predicted image for the current image according to the selected prediction mode.

To achieve the above and/or other aspects and advantages, embodiments of the present invention include an encoding method, including selecting a prediction mode that is determined to be optimal for blocks of each color component of a current image based on characteristics of a predetermined image, generating a predicted image for the current image according to the selected prediction mode, generating residues, of each color component, which correspond to differences between the current image and the predicted image, and generating a bitstream by encoding the generated residues.

To achieve the above and/or other aspects and advantages, embodiments of the present invention include at least one medium including computer readable code to control at least one processing element to implement embodiments of the present invention.

To achieve the above and/or other aspects and advantages, embodiments of the present invention include an encoding system, including a selection unit to select a prediction mode that is determined to be optimal for blocks of each color component of a current image based on characteristics of a predetermined image, a generation unit to generate a predicted image for the current image according to the selected prediction mode and to generate residues, of each color component, which correspond to differences between the current image and the predicted image, and an encoding unit to generate a bitstream by encoding the generated residues.

To achieve the above and/or other aspects and advantages, embodiments of the present invention include a predicted image generating method to decode image information encoded in a bitstream, with the image information being encoded according to a prediction mode determined to be optimal for corresponding blocks of each color component of a corresponding current image, the method including restoring prediction mode information from the bitstream, the restored prediction mode information identifying the prediction mode, and generating a predicted image for the current image according to the prediction mode identified by the restored prediction mode information.

To achieve the above and/or other aspects and advantages, embodiments of the present invention include at least one medium including computer readable code to control at least one processing element to implement a predicted image generating method to decode image information encoded in a bitstream, with the image information being encoded according to a prediction mode determined to be optimal for corresponding blocks of each color component of a corresponding current image, the method including restoring prediction mode information from the bitstream, the restored prediction mode information identifying the prediction mode, and generating a predicted image for the current image according to the prediction mode identified by the restored prediction mode information.

To achieve the above and/or other aspects and advantages, embodiments of the present invention include a predicted image generating system to decode image information encoded in a bitstream, with the image information being encoded according to a prediction mode determined to be optimal for corresponding blocks of each color component of a corresponding current image, the system including a decoding unit to restore prediction mode information from the bitstream, the restored prediction mode information identifying the prediction mode, and a generation unit to generate a predicted image for the current image according to the prediction mode identified by the restored prediction mode information.

To achieve the above and/or other aspects and advantages, embodiments of the present invention include a decoding method to decode image information encoded in a bitstream, with the image information being encoded according to a prediction mode determined to be optimal for corresponding blocks of each color component of a corresponding current image, the method including restoring prediction mode information from the bitstream, the restored prediction mode information identifying the prediction mode, generating residues that correspond to differences between the current image and a reference image for the current image, according to the prediction mode identified by the restored prediction mode information, generating a predicted image according to the prediction mode identified by the restored prediction mode information, and generating a restored image that corresponds to a sum of the generated residues and the generated predicted image.

To achieve the above and/or other aspects and advantages, embodiments of the present invention include at least one medium including computer readable code to control at least one processing element to implement a decoding method to decode image information encoded in a bitstream, with the image information being encoded according to a prediction mode determined to be optimal for corresponding blocks of each color component of a corresponding current image, the method including restoring prediction mode information from the bitstream, the restored prediction mode information identifying the prediction mode, generating residues that correspond to differences between the current image and a reference image for the current image, according to the prediction mode identified by the restored prediction mode information, generating a predicted image according to the prediction mode identified by the restored prediction mode information, and generating a restored image that corresponds to a sum of the generated residues and the generated predicted image.

To achieve the above and/or other aspects and advantages, embodiments of the present invention include a decoding system to decode image information encoded in a bitstream, with the image information being encoded according to a prediction mode determined to be optimal for corresponding blocks of each color component of a corresponding current image, the system including a decoding unit to restore prediction mode information from the bitstream, the restored prediction mode information identifying the prediction mode, a first generation unit to generate a predicted image for the current image according to the prediction mode identified by the restored prediction mode information, and a second generation unit to generate residues that correspond to differences between the current image and the predicted image according to the prediction mode identified by the restored prediction mode information and to generate a restored image corresponding to a sum of the generated residues and the generated predicted image.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 1:
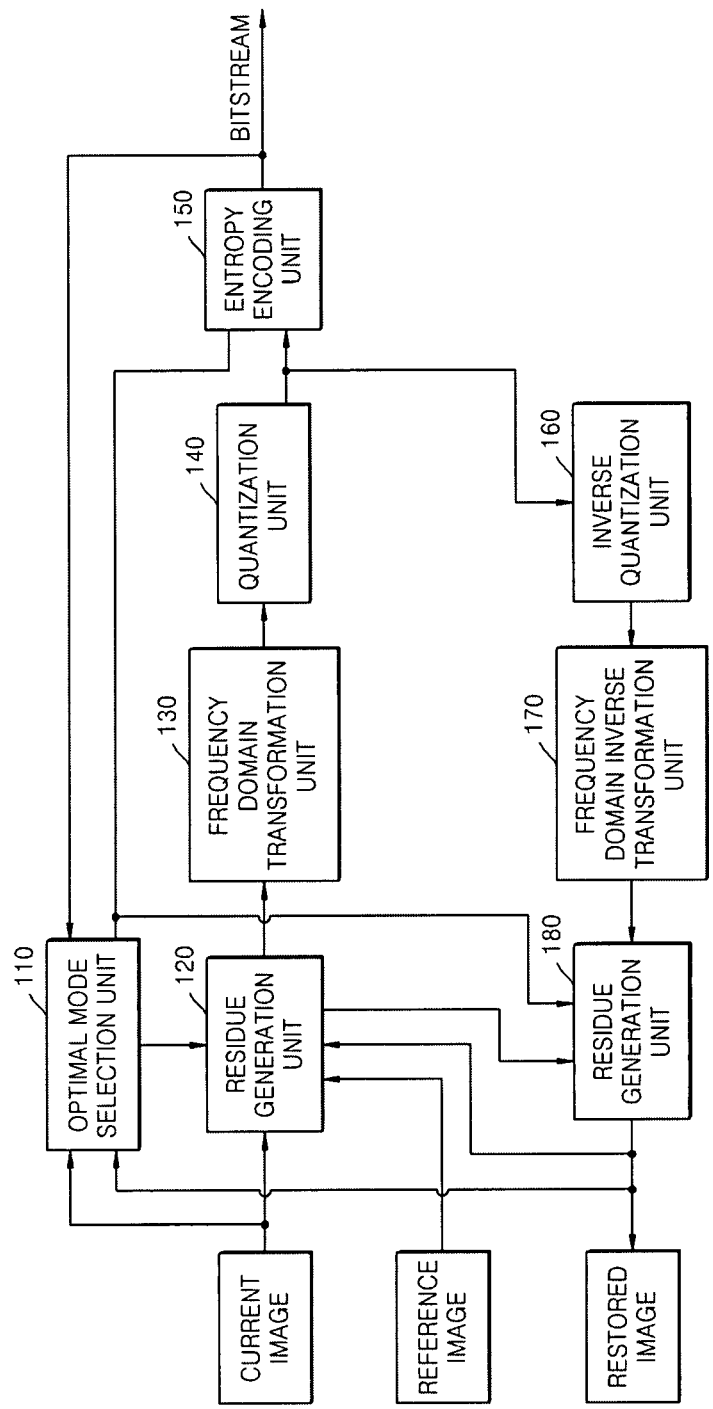
FIG. 1 illustrates a moving picture encoding system, according to an embodiment of the present invention.

DETAILED DESCRIPTION OF THE
PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

In describing embodiments herein, a current image should be considered as meaning a target image in a current moving picture that is to be encoded and/or decoded, and a reference image should be considered as meaning an image that is referred to when encoding or decoding the current image. Generally, the reference image is a previous image that precedes the current image, though the reference image may also be a subsequent image, and/or a plurality of reference images may be used.

FIG. 1 is a block diagram of a moving picture encoding system, according to an embodiment of the present invention.

Referring to FIG. 1, the moving picture encoding system may include an optimal mode selection unit 110, a residue generation unit 120, a frequency domain transformation unit 130, a quantization unit 400, an entropy encoding unit 150, an inverse quantization unit 160, a frequency domain inverse transformation unit 170, and a restored image generation unit 180, for example.

The optimal mode selection unit 110 selects an optimal prediction mode for the macro blocks, which correspond to each other, of the color components of a current image based on the characteristics of a sample image. Here, macro blocks, which correspond to each other, of one color component also correspond to macro blocks of all the other remaining color components.

For example, the optimal mode selection unit 110 may select one of a single prediction mode, which may be commonly applied to the macro blocks, which correspond to each other, of the color components of the current image, and a multiple prediction mode, which may be independently applied to the macro blocks, which correspond to each other, of the color components of the current image.

When the optimal mode selection unit 110 selects the single prediction mode, a corresponding prediction mode for generating second residues that correspond to differences between first residues of the color components can be selected.

For example, when the optimal mode selection unit 110 selects the single prediction mode, the prediction mode may be, for example, an "RCT mode" for performing Residual Color Transformation (RCT), an "IPP transformation mode" for performing Inter-Plane Prediction (IPP) transformation, or an "RCP transformation mode" for performing Residual Color Prediction (RCP), noting that alternative embodiments are equally available. Such RCT, IPP, and RCP transformations will be described in greater detail below.

In an embodiment of the present invention, the referenced sample image may be one of the previous images that precede the current image. In order to select the optimal prediction mode for the macro blocks, the optimal mode selection unit 110 may, thus, select all possible prediction modes for the sample image one by one, and compare the results of encoding performed according to the selected prediction mode, thereby selecting a prediction mode that is optimal for the macro blocks, which correspond to each other, of the color components of the sample image. The selected prediction mode may then be used as the optimal prediction mode for the macro blocks, which correspond to each other, of the color components of the current image.

In particular, the optimal mode selection unit 110 may select a prediction mode that leads to a minimum size of the resultant bitstream from the encoding of the sample image, and/or a minimum amount of distortion in quality between the original sample image and a restored sample image, for example. As will be described later, the size of the resultant bitstream obtained as the result of the encoding of the sample image corresponds to the size of the bitstream generated by the entropy encoding unit 150, for example, with the restored sample image corresponding to a restored image generated by the restored image generation unit 180, for example.

In an embodiment of the present invention, the optimal mode selection unit 110 may select the optimal prediction mode using a Lagrangian optimization method, for example. In other words, the optimal mode selection unit 110 may calculate the distortion in the image from the average of the sums of the products of squaring the differences between the original image and the restored image obtained using the below Equation 1, for example.

$$D = \sum_{i=0}^{N} (p_i - q_i)^2 \quad \text{Equation 1}$$

Here, D indicates the degree of picture quality distortion, p indicates a pixel value in the current image, q indicates a pixel value in the previous image, and i indicates a pixel index in a current macro block of the current image.

Thus, in an embodiment, and as described below in Equation 2, the optimal mode selection unit 110 may multiply the size of the bitstream "R", e.g., the number of bits in the bitstream, by a constant "λ" and add the degree of picture quality distortion "D" to the product so as to compensate for a difference, in units between the degree of picture quality distortion and the size of the bitstream, thereby calculating a final value "L" to be used for selecting the optimal prediction mode for the macro blocks, which correspond to each other, of the color components of the current image.

$$L = D + \lambda R \quad \text{Equation 2:}$$

Here, R indicates the size of the bitstream, and λ indicates a predetermined constant. The final value L can be calculated for each prediction method, and the prediction method with the smallest L may be selected from among the prediction methods used for the calculation.

According to an experiment performed using such a Lagrangian optimization method, the optimal mode selection unit 110 may select the single prediction mode when the similarity between the color components of the sample image is high, and select the multiple prediction mode when the similarity between the color components of the sample is low.

The residue generation unit 120 may generate a predicted image for the macro blocks, which correspond to each other, of the color components of the current image according to the prediction mode selected by the optimal mode selection unit 110, and generate residues that correspond to differences between the current image and the predicted image. Alternatively, the residue generation unit 120 may generate the predicted image for the macro blocks, which correspond to each other, of the color components of the current image according to the prediction mode selected by the optimal mode selection unit 110, generate first residues that correspond to differences between the current image and the predicted image, and generate second residues that correspond to differences between the first residues for the macro blocks, which correspond to each other, of the color components, noting that alternative embodiments are also available.

The frequency domain transformation unit 130 may further transform residues generated by the residue generation unit 120, which are color space residues, into values in the frequency domain. Alternatively, in an embodiment, the frequency domain transformation unit 130 may transform the second residues generated by the residue generation unit 120, which are color space residues, into values in the frequency domain. According to the H.264/MPEG-4 AVC standard, Discrete Hadamard Transformation (DHT), Discrete Cosine Transformation (DCT)-based integer transformation, etc., are suggested as color space to frequency domain transformation methods, noting that alternative embodiments may equally be available.

The quantization unit 140 quantizes the values transformed by the frequency domain transformation unit 130, e.g., the quantization unit 140 divides the frequency component values, which are the results of the transformation by the frequency domain transformation unit 130, by a quantization parameter, and approximates the results to integer values.

The entropy encoding unit 150 further generates a bitstream by entropy-encoding the values quantized by the quantization unit 140. In particular, in an embodiment of the present invention, the entropy encoding unit 150 generates a bitstream including information representing which prediction mode was used in the moving picture encoding, e.g., as selected by the optimal mode selection unit 110, by entropy-encoding the quantized values together with such prediction mode information. According to the H.264/MPEG-4 AVC standard, for example, Context-Adaptive Variable Length Coding (CAVLC), Context-Adaptive Binary Arithmetic Coding (CABAC), etc., have been suggested as entropy encoding methods.

In particular, the entropy encoding unit 150 generates the bitstream including information representing the prediction mode selected by the optimal mode selection unit 110 in a macro block header for each color component of the current image. A moving picture decoding system illustrated in FIG. 10 receives and decodes this bitstream so that the prediction mode used by the moving picture encoding system is identified.

When the prediction modes selected by the optimal mode selection unit 110 for the macro blocks, which correspond to each other, of the color components of the current image are identical to each other, the entropy encoding unit 150 may generate a bitstream including information representing only one prediction mode identically selected by the optimal mode selection unit 110 for all the macro blocks making up a single sequence or for all the macro blocks making up a single picture, at a sequence level or a picture level, which are upper levels relative to the macro block level. Accordingly, with all corresponding macro blocks being encoded with the same prediction mode, the information recorded in corresponding macro block headers can be omitted, thereby increasing the encoding efficiency.

Similarly, when some of the prediction modes selected by the optimal mode selection unit 110 for the macro blocks of the color components of the current image are identical, the entropy encoding unit 150 may generate a bitstream including information representing only one prediction mode identically selected by the optimal mode selection unit 110 for those corresponding macro blocks making up a single sequence or a single picture, at a sequence level or a picture level, and including information representing the corresponding prediction modes, which are selected by the optimal mode selection unit 110 for the remaining corresponding macro blocks, in macro block headers, thereby increasing the encoding efficiency.

The inverse quantization unit 160 may further perform inverse quantization on the values quantized by the quantization unit 140, e.g., inverse quantization unit 160 may restore the frequency component values by multiplying the integer values approximated by the quantization unit 140 by a quantization parameter.

The frequency domain inverse transformation unit 170 may then restore the residues corresponding to the differences between the current image and the predicted image by transforming the frequency component values, which are restored by the inverse quantization unit 160, which are frequency domain values, into values in the color space. Alternatively, in an embodiment, the frequency domain inverse transformation unit 170 restores the aforementioned second residues, which are frequency domain values corresponding to the differences between the aforementioned first residues of the color components, into the values in the color space.

The restored image generation unit 180 may generate a restored image that corresponds to the sum of the predicted image generated by the residue generation unit 120 and the residues restored by the frequency domain inverse transformation unit 170. Alternatively, in an embodiment, the restored image generation unit 180 may generate first residues corresponding to the sums of the second residues restored by the frequency domain inverse transformation unit 170 and generate the restored image corresponding to the sum of the predicted image generated by the residue generation unit 120 and the generated first residues.

Figure 2:
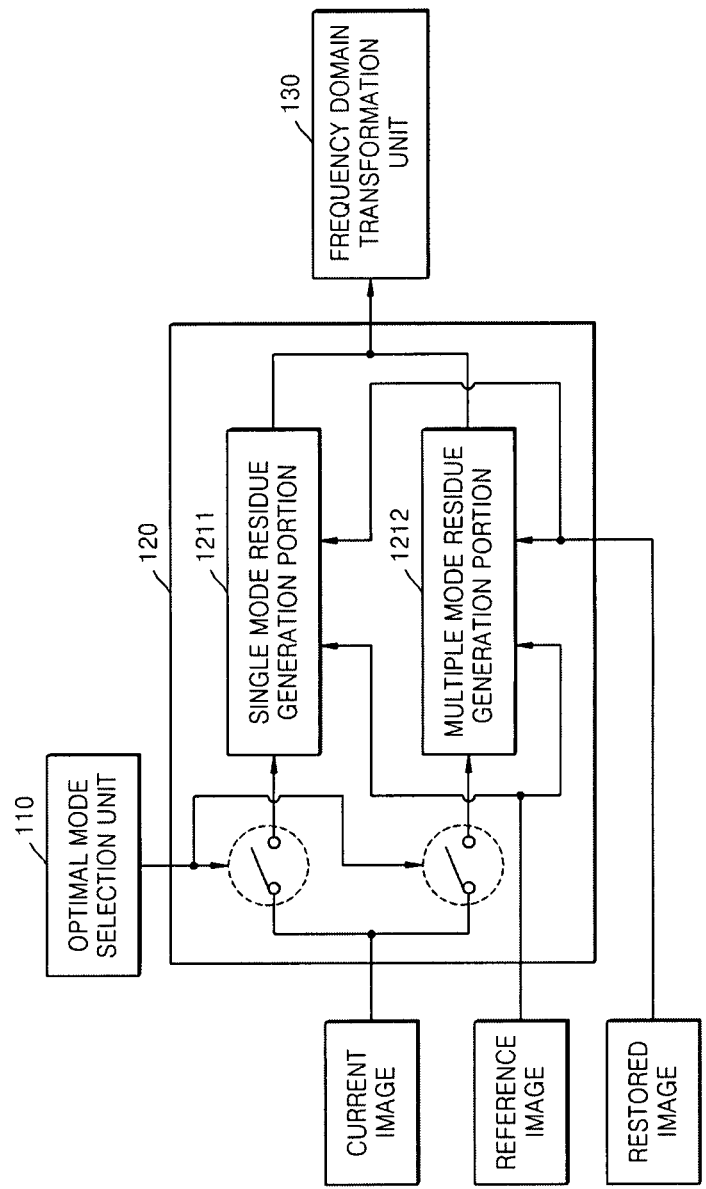
FIG. 2 illustrates a residue generation unit, such as that illustrated in FIG. 1, according to an embodiment of the present invention.

FIG. 2 illustrates a residue generation unit 120, according to an embodiment of the present invention.

Referring to FIG. 2, the residue generation unit 120 may include a single mode residue generation portion 1211 and a multiple mode residue generation portion 1212, for example.

When the prediction mode selected by the optimal mode selection unit 110 is the single prediction mode, the single mode residue generation portion 1211 may perform spatial prediction, such as single intra prediction, for removing special redundancy in the current image, according to the single prediction mode, or perform temporal prediction, such as single inter prediction, for removing temporal redundancy between the current image and the reference image, according to the single prediction mode. Subsequently, the single mode residue generation unit 1211 may generate a residue corresponding to a difference between the current image and the predicted image.

In particular, the single mode residue generation portion 1211 may divide the macro blocks, which correspond to each other, of the color components of the current image into blocks of a predetermined size which is commonly applied to the macro blocks, which correspond to each other, of the color components of the current image, determine motion vectors between the reference image and the current images, which are commonly applied to the divided blocks, which correspond to each other, of the color components of the current image, and generate the predicted image for the current image from the reference image using the determined motion vectors, thereby performing single inter prediction.

For example, the single mode residue generation unit 1211 may divide the macro blocks, which correspond to each other, of the color components of the current image into equal blocks, determine motion vectors that are commonly applied to the divided blocks, which correspond to each other, of the color components, and generate the predicted image for the current image from the reference image using the determined motion vectors, thereby performing single inter prediction.

Figure 3:
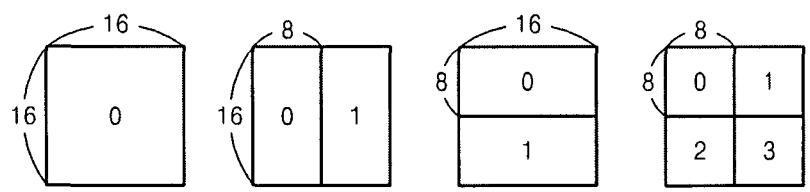
FIG. 3 illustrates a method of dividing macro blocks for inter prediction.
Figure 3:
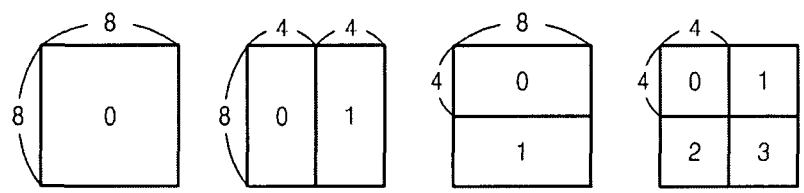

FIG. 3 illustrates a method of dividing macro blocks for inter prediction. Referring to FIG. 3, for inter prediction, a 16×16 macro block may be divided into blocks of various sizes of 16×16, 16×8, 8×16, 8×16, 8×8, etc., and a motion vector for each divided block can be determined. Furthermore, after an 8×8 block is further divided into blocks of sizes of 8×8, 8×4, 4×8, 4×4, etc., a motion vector for each divided block may be determined. As macro blocks are divided into blocks of smaller size, more refined motions between the current image and the reference image can be included in the residues.

For example, in a YCoCg color space, the single mode residue generation portion 1211 may divide the macro blocks, which correspond to each other, of a Y component, a Co component, and a Cg component equally, for example, into an 8×8 size, and determine a motion vector which is commonly applied to the divided blocks, which correspond to each other, of the Y component, the Co component, and the Cg component. As another example, in a RGB color space, the single mode residue generation portion 1211 may divide the macro blocks, which correspond to each other, of each of a R component, a G component, and a B component equally, for example, into an 8×8 size, and determine a motion vector which is commonly applied to the divided blocks, which correspond to each other, of the R component, the G component, and the B component.

In addition, the single mode residue generation portion 1211 may divide the macro blocks, which correspond to each other, of the color components of the current image into blocks of a predetermined size which is commonly applied to the macro blocks, which correspond to each other, of the color components of the current image, determine a prediction direction that is commonly applied to the divided blocks, which correspond to each other, of the color components, predict blocks making up the current image from adjacent pixels in the restored image, which is generated by the restored image generation unit 180, using the determined prediction direction, and generate a predicted image made up by the predicted blocks, thereby performing single intra prediction.

In other words, for example, the single mode residue generation portion 1211 may divide the macro blocks, which correspond to each other, of the color components of the current image into equal blocks, determine a prediction direction which is commonly applied to the divided blocks, which correspond to each other, of the color components, predict blocks making up the current image from adjacent pixels in the restored image, which is generated by the restored image generation portion 180, using the determined prediction direction, and generate a predicted image made up by the predicted blocks, thereby performing single intra prediction.

Figure 4:
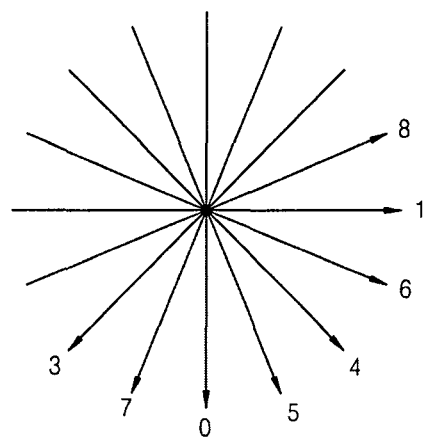
FIG. 4 illustrates prediction directions defined for intra prediction.

FIG. 4 illustrates prediction directions defined for intra prediction, according to an embodiment of the present invention.

Referring to FIG. 4, after a 16×16 macro block has been divided into blocks of 4×4 size, a predicted image may be generated using 9 prediction directions for each divided block. Alternatively, in an embodiment, the predicted image may be generated using 4 prediction directions for a 16×16 macro block. In particular, in the former case, in order to predict blocks of a 4×4 size, i.e., Pa, Pb, through Pq, spatially adjacent pixels P0, P1, through P12 in the restored image are used. The blocks Pa, Pb, through Pq are predicted from the adjacent pixels P0, P1, through P12 using 9 prediction directions from 0 to 9. For example, in a prediction direction 0, adjacent pixels P1, P2, P3, and P4 are projected in a vertical direction corresponding to the prediction direction 0, so that Pa, Pe, Pi, and Pm are predicted from P1; Pb, Pf, Pj, and Pn are predicted from P2; Pc, Pg, Pk, and Pd are predicted from P3; and Pd, Ph, Pl, and Pq are predicted from P4. Similarly, Pa, Pb, through Pq can be predicted using other prediction directions as described above.

For example, in a YCoCg color space, for example, the single mode residue generation portion 1211 may divide the macro blocks, which correspond to each other, of each of a Y component, a Co component, and a Cg component equally, for example, into blocks of 4×4 size, and determine a prediction direction that is commonly applied to the divided blocks, which correspond to each other, of the Y component, the Co component, and the Cg component. As another example, in a RGB color space, the single mode residue generation portion 1211 may divide the macro blocks, which correspond to each other, of each of a R component, a G component, and a B component equally, for example, into blocks of 4×4 size, and determine a prediction direction that is commonly applied to the divided blocks, which correspond to each other, of the R component, the G component, and the B component.

As described above, since the single mode residue generation portion 1211 applies the same temporal prediction method and the same spatial prediction method to all the color components, the similarity between the residues of the color components become higher. In addition, since a block size, a motion vector, a prediction direction, etc., may be commonly applied to all the color components, there is no need to encode and transmit such information for each color component. In other words, it is sufficient to encode and transmit such information only once for all the color components, thereby increasing the overall encoding efficiency.

When the prediction mode selected by the optimal mode selection unit 110 is the multiple prediction mode, the multiple mode residue generation portion 1212 may generate a prediction mode by performing temporal prediction, such as multiple inter prediction, for removing temporal redundancy between the current image and the reference image according to the multiple prediction mode, or by performing spatial prediction, such as multiple intra prediction, for removing special redundancy in the current image according to a prediction mode that is independently applied to the macro blocks, which correspond to each other, of the color components of the current image.

In particular, the multiple mode residue generation portion 1212 may divide the macro blocks, which correspond to each other, of the color components into blocks of sizes which may be independently applied to each of the macro blocks, which correspond to each other, of the color components of the current image, determine motion vectors between the reference image and the current image, which are independently applied to the divided blocks of each color component, and generate a predicted image for the current image using the determined motion vectors, thereby performing multiple inter prediction.

In other words, the multiple mode residue generation portion 1212 may divide the macro blocks, which correspond to each other, of the color components of the current image into blocks of different sizes, determine different motion vectors for the divided blocks of each color component, and generate a predicted image for the current image from the reference image using the determined motion vectors. Of course, since the multiple mode residue generation portion 1212 may perform inter prediction according to prediction modes that are independently applied to the macro blocks, which correspond to each other, of the color components of the current image, the multiple mode residue generation portion 1212 may still divide all the macro blocks of the color components of the current image equally and may determine motion vectors which are the same for the divided blocks of each color component.

For example, in the YCoCg color space, the multiple mode residue generation portion 1212 may divide the macro blocks of the Y component, the Co component, and the Cg component into blocks of different sizes, e.g., with the macro blocks of the Y component divided into blocks of a 4×4 size, the macro blocks of the Co component divided into blocks of an 8×8 size, and the macro blocks of the Cg component divided into blocks of an 8×8 size, and determine different motion vectors for the divided blocks of each color component, i.e., the Y component, the Co component, and Cg component. In addition, for example, in the RGB color space, the multiple mode residue generation portion 1212 may divide the macro blocks of the R component, the G component, and the B component into blocks of different sizes, e.g., with the macro blocks of the R component divided into blocks of an 8×8 size, the macro blocks of the G component divided into blocks of a 4×4 size, and the macro blocks of the B component divided into blocks of an 8×8 size, and determine different motion vectors for the divided blocks of each color component, i.e., the R component, the G component, and the B component.

In addition, the multiple mode residue generation portion 1212 may divide the macro blocks, which correspond to each other, of the color components into blocks of sizes that are independently applied to the macro blocks, which correspond to each other, of the color components of the current image, determine prediction directions that are independently applied to the divided blocks of each color component, predict blocks making up the current image from adjacent pixels in the restored image generated by the restored image generation unit 180 using the determined prediction directions, and generate a predicted image made up by the predicted blocks, thereby performing multiple intra prediction.

In other words, the multiple mode residue generation portion 1212 may divide the macro blocks, which correspond to each other, of the color components of the current image into blocks of different sizes, determine different prediction directions for the divided blocks of each color component, predict blocks making up the current image from adjacent pixels in the restored image generated by the restored image generation unit 180 using the generated prediction directions, and generate the predicted image made up by the predicted blocks, thereby performing multiple intra prediction. Of course, since the multiple mode residue generation portion 1212 performs intra prediction according to prediction modes that are independently applied to the macro blocks, which correspond to each other, of the color components of the current image, the multiple mode residue generation portion 1212 may still divide the macro blocks, which correspond to each other, of the color components of the current image equally and may determine motion vectors which are commonly applied to the divided blocks of the color components.

For example, in the YCoCg color space, the multiple mode residue generation portion 1212 may divide the macro blocks of the Y component, the Co component, and the Cg component into blocks of different sizes, e.g., with the macro blocks of the Y component divided into blocks of a 4×4 size, the macro blocks of the Co component divided into blocks of a 16×16 size, and the macro blocks of the Cg component divided into blocks of a 16×16 size, and determine different prediction directions for the divided blocks of each color component, i.e., the Y component, the Co component, and the Cg component. In addition, for example, in the RGB color space, the multiple mode residue generation portion 1212 may divide the macro blocks of the R component, the G component, and the B component into blocks of different sizes, e.g., with the macro blocks of the R component divided into blocks of a 16×16 size, the macro blocks of the G component divided into blocks of a 4×4 size, and the macro blocks of the B component divided into blocks of a 16×16 size, and determine different prediction directions for the divided blocks of each color components, i.e., the R component, the G component, and the B component.

Furthermore, the multiple mode residue generation portion 1212 may perform multiple inter prediction or multiple intra prediction on the macro blocks, which correspond to each other, of the color components of the current image. For example, the multiple mode residue generation portion 1212 may perform multiple inter prediction on the macro blocks of one of the color components of the current image and perform multiple intra prediction on the macro blocks of the other color components.

As described above, since the multiple mode residue generation portion 1212 can perform temporal prediction and spatial prediction using different temporal prediction and spatial prediction methods on the different color components, if the similarity between the color components is low, independent encoding methods which are most suitable for each color component can be used for effective prediction encoding, thereby increasing the overall encoding efficiency. However, it may be sufficient to encode any of the block sizes, motion vectors, and prediction directions, which are independently applied to each color component, only once for transmission. Thus, the encoding efficiency increases.

Figure 5:
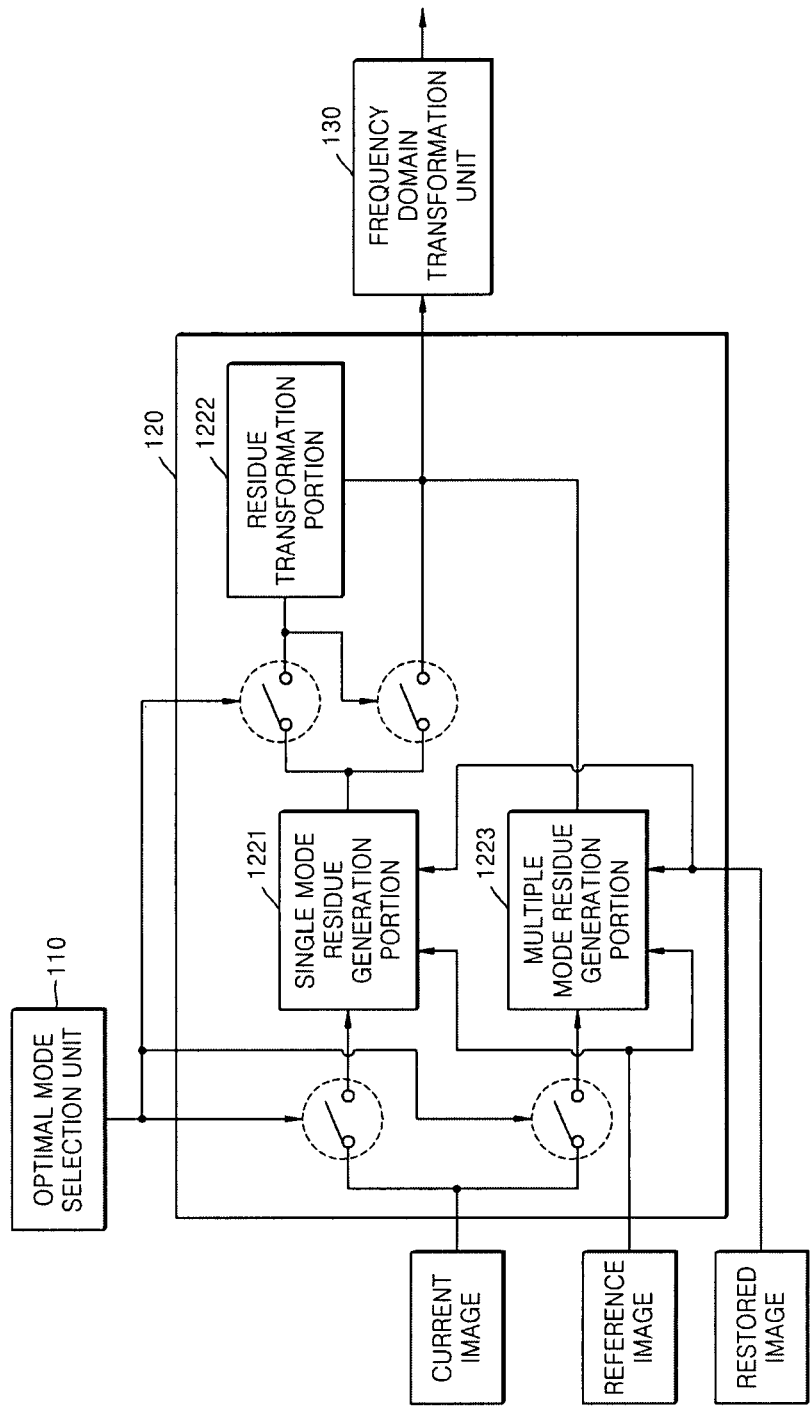
FIG. 5 illustrates a residue generation unit, such as that illustrated in FIG. 1, according to another embodiment of the present invention.

FIG. 5 illustrates a residue generation unit 120, such as that illustrated in FIG. 1, according to another embodiment of the present invention.

Referring to FIG. 5, the residue generation unit 120 may include a single mode residue generation portion 1221, a residue transformation portion 1222, and a multiple mode residue generation portion 1223. The single mode residue generation portion 1221 and the multiple mode residue generation portion 1223 may perform similar operations, respectively, as the single mode residue generation portion 1211 and the multiple mode residue generation portion 1212 illustrated in FIG. 2.

However, even after inter prediction or intra prediction is performed in the single mode residue generation portion 1221, redundancy between the color components still remains. The residue transformation portion 1222 may eliminate the redundancy between the color components. In order to distinguish the residues generated by single mode residue generation portion 1221 and the residues generated by the residue transformation portion 1222, the former can be referred to as "first residues", and the latter can be referred to as "second residues".

If the prediction mode selected by the optimal mode selection unit 110 is the residue transformation mode, the residue transformation portion 1222 may generate second residues that correspond to differences between the first residues generated by the single mode residue generation portion 1221.

Figure 6:
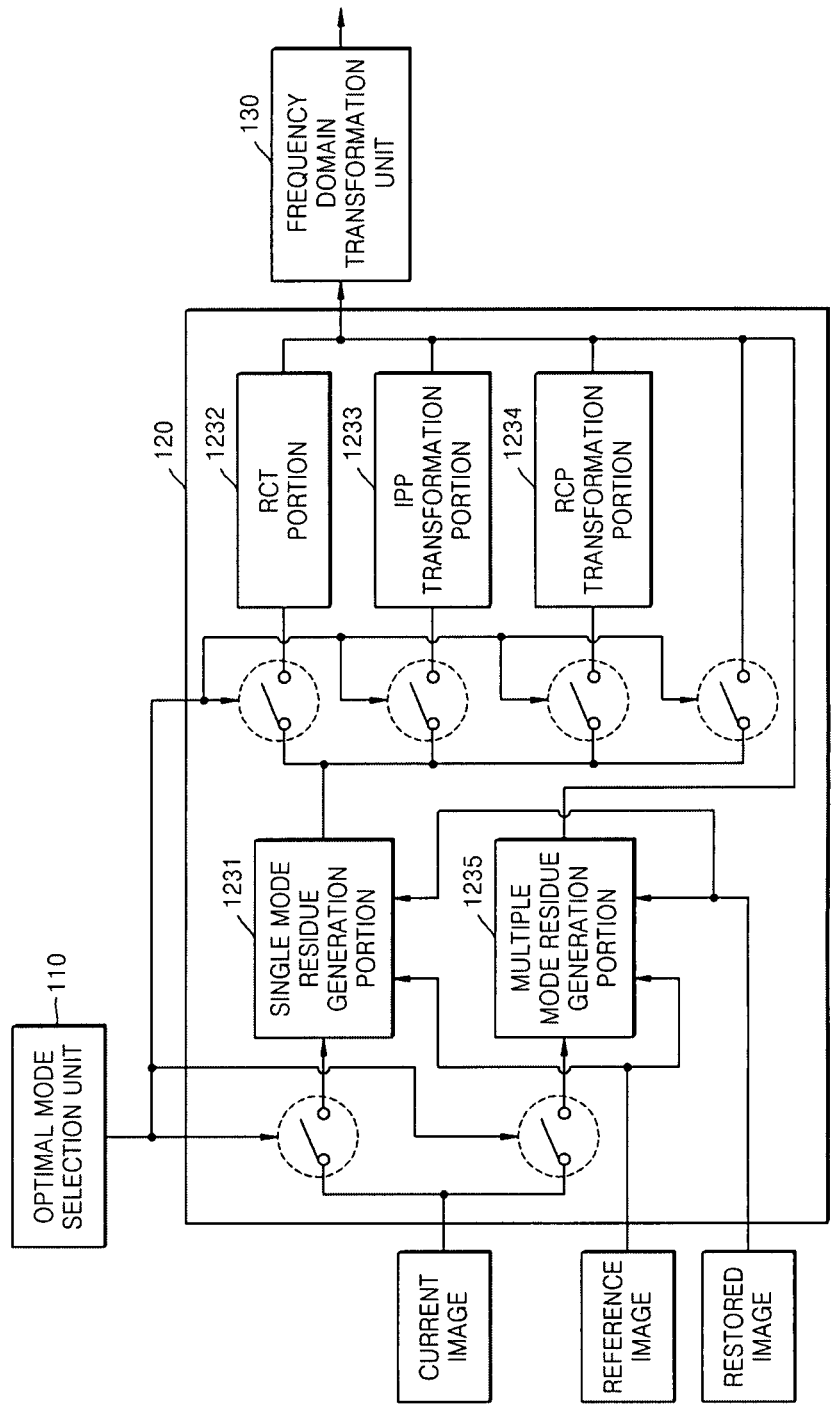
FIG. 6 illustrates a residue generation unit, such as that illustrated in FIG. 1, according to still another embodiment of the present invention.

FIG. 6 illustrates a residue generation unit 120, such as that illustrated in FIG. 1, according to another embodiment of the present invention.

Referring to FIG. 6, the residue generation unit 120 may include a single mode residue generation portion 1231, a residual color transformation (RCT) portion 1232, an interplane prediction (IPP) transformation portion 1233, a residual color prediction (RCP) transformation portion 1234, and a multiple mode residue generation portion 1235, for example. The single mode residue generation portion 1231 and the multiple mode residue generation portion 1235 may perform similar operations, respectively, as the single mode residue generation portion 1211 and the multiple mode residue generation portion 1212 illustrated in FIG. 2. As described above, in order to distinguish the residues generated by the single mode residue generation portion 1231 and the residues generated by the RCT portion 1232, the IPP transformation portion 1233, and the RCP transformation portion 1234, the former can be referred to as "first residues", and the latter can be referred to as "second residues".

Methods of generating the second residues that correspond to the differences between the first residues generated by the single mode residue generation portion 1231 include, for example, RCT, IPP transformation, and RCP transformation. Here, RCT can be used for generating the second residues in the YCoCg color space, and IPP transformation is for generating the second residues in the RGB color space. In RCP transformation, which is similar to IPP transformation, when a residue of the G component is used as a predictor, the same transformation as IPP transformation can be performed after noise is removed by predetermined filtering.

If the prediction mode selected by the optimal mode selection unit 110 is the RCT mode, the RCT portion 1232 may generate second residues that correspond to the differences between the first residues of the Y component, the Co component, and the Cg component in the YCoCg color space using the below Equation 3, for example. In particular, the following relationships may be considered: $Y=R+2G+B>>2$, $Co=R-B>>1$, and $Cg=-R+2G-B>>2$.

$$\Delta^2 B = \Delta R - \Delta B$$

$$t = \Delta B + (\Delta^2 B >> 1)$$

$$\Delta^2 R = \Delta G - t$$

$$\Delta^2 G = t + (\Delta^2 R >> 1) \quad \text{Equation 3:}$$

Here, $\Delta X$ denotes first residues, $\Delta 2X$ denotes second residues, and ">>" denotes a right shift operation, which is subsequently equivalent to division by 2, and variable t is used for the purpose of temporary calculation.

If the prediction mode selected by the optimal mode selection unit 110 is the IPP transformation mode, the IPP transformation portion 1233 may generate second residues that correspond to the differences between the first residues of the R component, the G component, and the B component in the RGB color space according to the IPP transformation mode in view of the below Equation 4, for example.

$$\Delta^2 G = \Delta G'$$

$$\Delta^2 R = \Delta R - \Delta G'$$

$$\Delta^2 B = \Delta B - \Delta G' \quad \text{Equation 4:}$$

Here, $\Delta X$ denotes first residues, $\Delta 2X$ denotes second residues, and $\Delta X'$ denotes restored first residues. In particular, Equation 4 is effective when the G component includes a large amount of image information. The second residues can be calculated using the R component or the B component as a dominant component.

If the prediction mode selected by the optimal mode selection unit 110 is the RCP transformation mode, after removing noise from each of the R component, the G component, and the B component in the RGB color space according to the RCP transformation mode using a 5-tap filter, expressed in the below Equation 5, for example, the RCP transformation portion 1234 generates second residues that correspond to the differences between the first residues of the R component, the G component, and the B component.

$$R'_{G,S} = 4 \cdot R'_G(i,j) + R'_G(i+1,j) + R'_G(i,j+1) + R'_G(i-1,j) + R'_G(i,j-1)$$

$$r'_G(i,j) = F(R'_G) = \text{sign}(R'_{G,S}) \cdot [(\text{abs}(R'_{G,S}) + 4) >> 3] \quad \text{Equation 5:}$$

In addition, after removing noise from each of the R component, the G component and the B component in the RGB color space using a 3-tap filter, expressed in the below Equation 6, for example, the RCP transformation portion 1234 generates second residues that correspond to the differences between the first residues of the R component, the G component, and the B component.

$$R'_{G,S} = R'_G(i-1,j) + 2 \cdot R'_G(i,j) + R'_G(i+1,j),$$

$$r'_G(i,j) = F(R'_G) = \text{sign}(R'_{G,S}) \cdot [(\text{abs}(R'_{G,S}) + 2) >> 2] \quad \text{Equation 6:}$$

In the above Equations 5 and 6, abs(x) denotes the absolute value of x, and sign(x) is given by the below Equation 7, for example.

$$\text{Sign}(x) = \begin{cases} 1, & x \geq 0 \\ -1, & x < 0 \end{cases}. \quad \text{Equation 7}$$

Figure 7A:
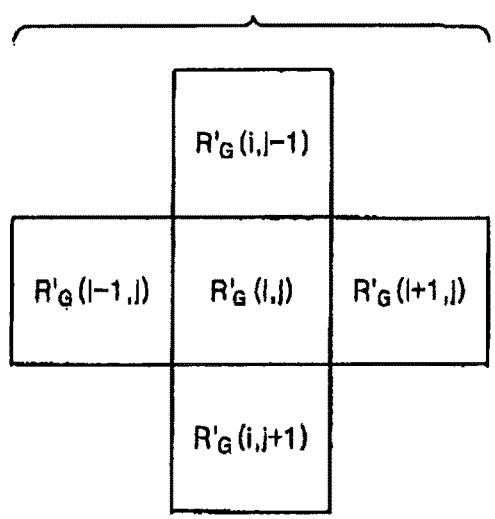
FIGS. 7A and 7B illustrate a 5-tap filter and a 3-tap filter, respectively, which may be used in embodiments of the present invention.
Figure 7B:
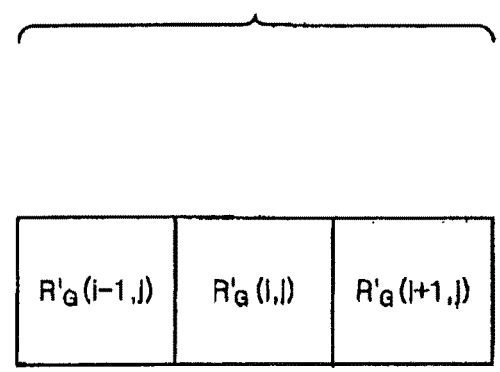

FIGS. 7A and 7B illustrate a 5-tap tilter and a 3-tap tilter, respectively, which are used in an embodiment of the present invention.

Referring to FIGS. 7A and 7B, a 5-tap filter used in an embodiment of the present invention uses 4 neighboring pixels around a pixel that is used as a predictor, and a 3-tap filter used in an embodiment of the present invention uses two, left and right pixels on either side of a pixel that is used as a predictor. In addition, weights may be used as in Equations 5 and 6.

Figure 8:
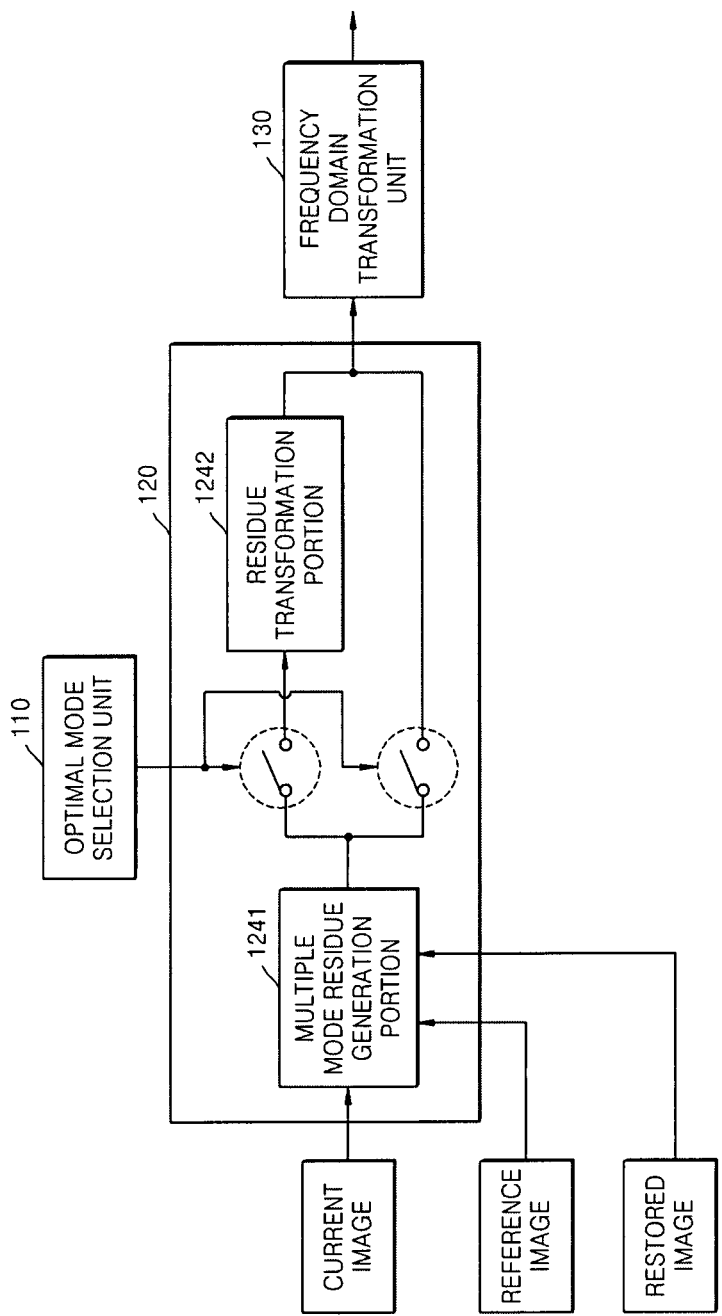
FIG. 8 illustrates a residue generation unit, such as that illustrated in FIG. 1, according to another embodiment of the present invention.

FIG. 8 illustrates a residue generation unit 120, such as that illustrated in FIG. 1, according to an embodiment of the present invention.

Referring to FIG. 8, the residue generation unit 120 may include a multiple mode residue generation portion 1241 and a residue transformation portion 1242, for example. The multiple mode residue generation portion 1241 may perform similar operations as the multiple mode residue generation portion 1212 illustrated in FIG. 2, for example.

However, even after inter prediction or intra prediction is performed in the multiple mode residue generation portion 1241, redundancy between the color components remains. The residue transformation portion 1242 may eliminate the redundancy between the color components. In order to distinguish the residues generated by the single mode residue generation portion 1241 and the residues generated by the residue transformation portion 1242, the former residue can be referred to as "first residues", and the latter can be referred to as "second residues".

If the prediction mode selected by the optimal mode selection unit 110 is the residue transformation mode, the residue transformation portion 1242 may generate second residues that correspond to the differences between the first residues generated by the multiple mode residue generation portion 1241, according to the residue transformation mode. Here, even after inter prediction or intra prediction is performed in the multiple mode residue generation portion 1241, redundancy between the color components may still remain. However, since the similarity between the color components is lower than in the single prediction mode, the compression efficiency in the residue transformation portion 1242 may be lower than the compression efficiency in the residue transformation portion 1222 illustrated in FIG. 5.

Figure 9:
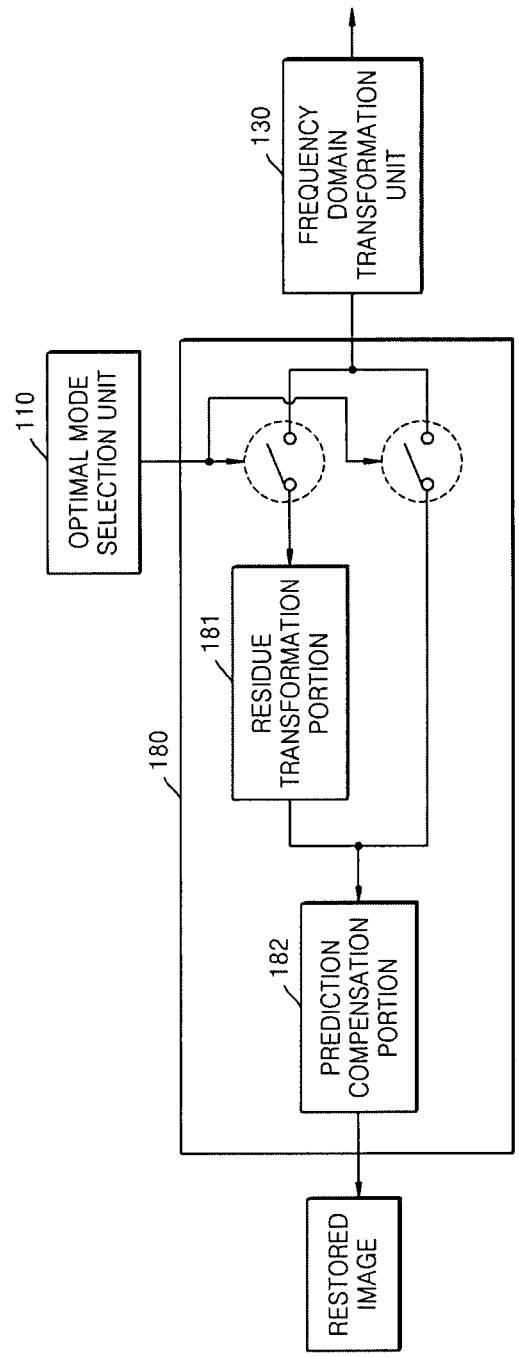
FIG. 9 illustrates a restored image generation unit, such as that illustrated in FIG. 1, according to an embodiment of the present invention.

FIG. 9 illustrates a restored image generation unit 180, such as that illustrated in FIG. 1, according to an embodiment of the present invention.

Referring to FIG. 9, the restored image generation unit 180 may include a residue inverse transformation portion 181 and a prediction compensation portion 182, for example.

The residue inverse transformation portion 181 may generate first residues that correspond to the sums of the second residues restored by the frequency domain inverse transformation portion 170. For example, the residue inverse transformation portion 181 may generate the first residues of the Y component, the Co component, and the Cg component, which correspond to the sums of the second residues of the Y component, the Co component, and the Cg component, respectively, using the below Equation 8, for example.

Equation 8:

$$t=\Delta^2 G'-(\Delta^2 R'>>1)$$

$$\Delta G'=\Delta^2 R'+t$$

$$\Delta B'=t-(\Delta^2 B'>>1)$$

$$\Delta R'=\Delta B'+\Delta^2 B' \qquad \text{Equation 8:}$$

Here, $\Delta X'$ denotes restored first residues, and $\Delta 2X'$ denotes restored second residues.

Alternatively, the residue inverse transformation portion 181 may generate the first residues of the R component, the G component, and the B component, which correspond to the sums of the second residues of the R component, the G component, and the B component, respectively, using the below Equation 9, for example.

$$\Delta G'=\Delta^2 G'$$

$$\Delta R'=\Delta^2 R'+\Delta G'$$

$$\Delta B'=\Delta^2 B'+\Delta G' \qquad \text{Equation 9:}$$

Here, $\Delta X'$ denotes restored first residues, and $\Delta^2 X'$ denotes restored second residues.

The prediction compensation portion 182 may generate a restored image that corresponds to the sum of the predicted image generated by the residue generation unit 120 and the first residues generated by the residue inverse transformation portion 181. For example, the prediction compensation portion 182 may generate a restored image in the YCoCg color space by calculating the sum of the predicted image generated by the residue generation unit 120 and the first residues generated by the residue inverse transformation portion 181. Alternatively, the prediction compensation portion 182 may generate a restored image in the RGB color space by calculating the sum of the predicted image generated by the residue generation unit 120 and the first residues generated by the residue inverse transformation portion 181. Here, it is further noted that alternate embodiments are also available.

Figure 10:
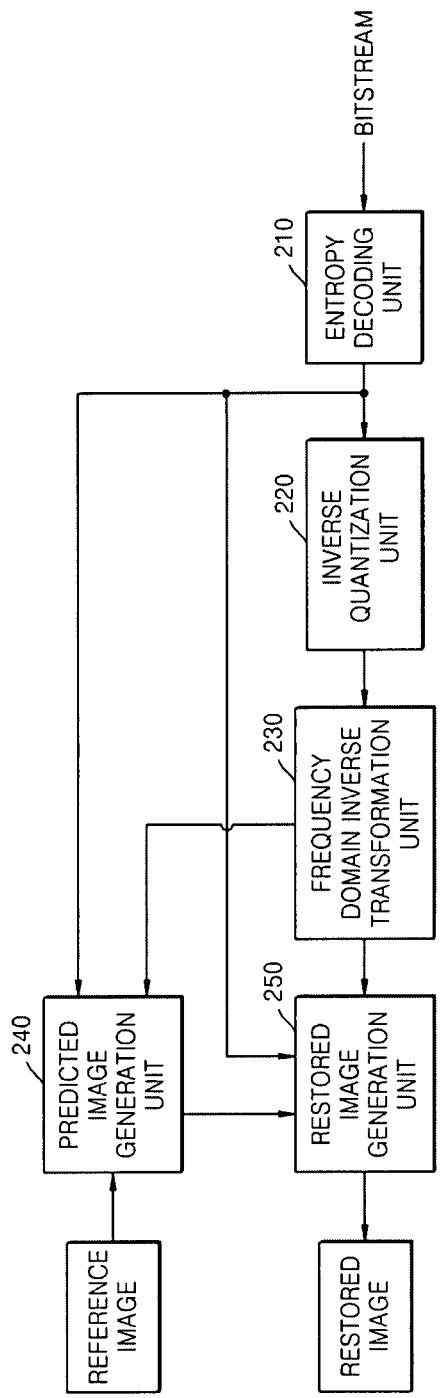
FIG. 10 illustrates a moving picture decoding system, according to an embodiment of the present invention.

FIG. 10 illustrates a moving picture decoding system, according to an embodiment of the present invention.

Referring to FIG. 10, the moving picture decoding system may include an entropy decoding unit 210, an inverse quantization unit 220, a frequency domain inverse transformation unit 230, a predicted image generation unit 240, and a restored image generation unit 250, for example.

The entropy decoding unit 210 may restore integer values corresponding to the current image and information representing the optimal prediction mode for the blocks of each color component of the current image by performing entropy-decoding on a bitstream, such as a bitstream output from the moving picture encoding system illustrated in FIG. 1. Here, for example, the optimal prediction mode for the blocks of each color component of the current image information can be the prediction mode used in the moving picture encoding system.

The inverse quantization unit 220 may restore the frequency component values by performing inverse quantization on the integer values restored by the entropy decoding unit 210. In other words, the inverse quantization unit 220 restores the frequency component values by multiplying the integer values restored by the entropy decoding unit 210 by a quantization parameter.

The frequency domain inverse transformation unit 230 may generate residues that correspond to differences between the current image and the predicted image by transforming the frequency component values restored by the inverse quantization unit 220, which are frequency domain values, into values in the color space. Alternatively, in an embodiment, the frequency domain inverse transformation unit 230 restores second residues that correspond to the differences between the first residues of the color components by transforming the frequency component values restored by the inverse quantization unit 220, which are frequency domain values, into values in the color space.

The predicted image generation unit 240 may generate a predicted image for the current image according to the prediction mode indicated by the information restored for the macro blocks, which correspond to each other, of the color components by the entropy decoding unit 210.

The restored image generation unit 250 may generate a restored image that corresponds to the sum of the predicted image generated by the predicted image generation unit 240 and the residues restored by the frequency domain inverse transformation unit 230. Alternatively, in an embodiment, the restored image generation unit 250 may generate first residues that correspond to the sums of the second residues restored by the frequency domain inverse transformation unit 230 and generate a restored image that corresponds to the sum of the predicted image generated by the predicted image generation unit 240 and the generated first residues.

Figure 11:
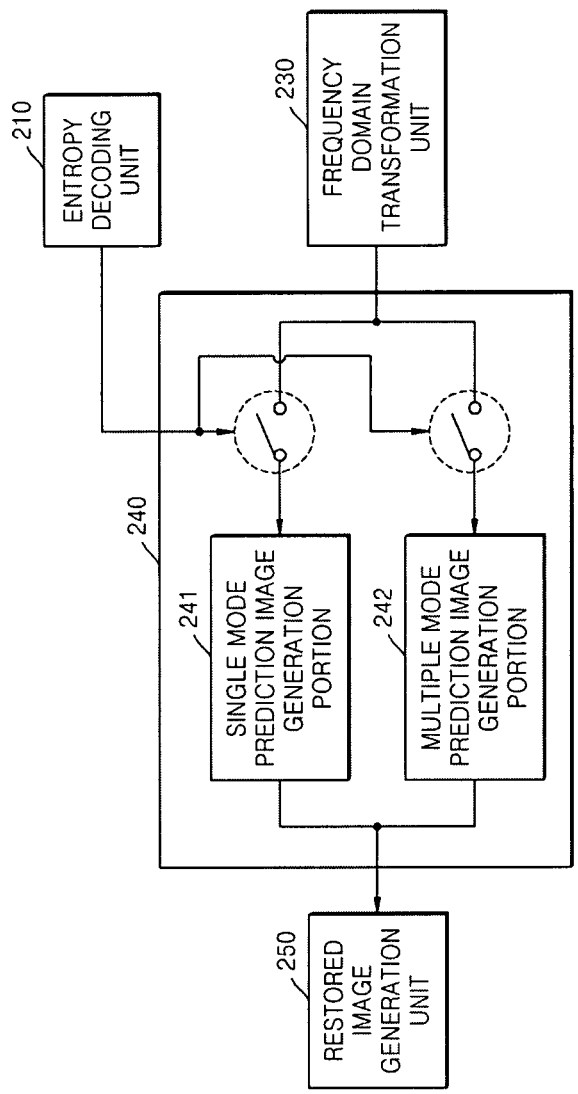
FIG. 11 illustrates a predicted image generation unit, such as that illustrated in FIG. 10, according to an embodiment of the present invention.

FIG. 11 illustrates a predicted image generation unit 240, such as that illustrated in FIG. 10, according to an embodiment of the present invention.

Referring to FIG. 11, the predicted image generation unit 240 may include a single mode prediction image generation portion 241 and a multiple mode prediction image generation portion 242, for example.

If the information restored by the entropy decoding unit 210 represents that a single prediction mode was applied in the encoding, the single mode prediction image generation portion 241 may generate a predicted image by performing single intra prediction or single inter prediction, for example. In particular, the single mode prediction image generation portion 241 may generate a predicted image for the current image from a reference image using motion vectors between the reference image and the current image, which are commonly applied to the blocks, which correspond to each other, of the color components. In other words, the single mode prediction image generation portion 241 may generate the predicted image for the current image from the reference image using the motion vectors that are commonly applied to the blocks, which are divided from the macro blocks, which correspond to each other, of the color components of the current image and correspond to each other.

In addition, the single mode prediction image generation portion 241 may further predict blocks making up the current image from adjacent pixels in the restored image generated by the restored image generation unit 250 using prediction directions that are commonly applied to the blocks, which correspond to each other, of the color components, which are divided equally from the macro blocks, which correspond to each other, of the color components of the current image, and generate a predicted image constituted by the predicted blocks.

If the information restored by the entropy decoding unit 210 represents that a multiple prediction mode was applied in the encoding, the multiple mode prediction image generation portion 242 may generate a predicted image by performing multiple inter prediction or multiple intra prediction. In particular, the multiple mode prediction image generation portion 242 may generate a predicted image for the current image from a reference image using motion vectors between the reference image and the current image, which are independently applied to the blocks of each color component, which are divided into different sizes from the macro blocks, which correspond to each other, of the color components of the current image. In other words, the multiple mode prediction image generation portion 242 may generate the predicted image for the current image from the reference image using different motion vectors for the blocks of each color component, which are divided into blocks of different sizes from the macro blocks, which correspond to each other, of the color components of the current image.

In addition, the multiple mode prediction image generation portion 242 may predict blocks making up the current image from adjacent pixels in the restored image generated by the restored image generation unit 250 using prediction directions that are commonly applied to the blocks, which correspond to each other, of the color components, wherein the blocks are divided to different sizes from the macro blocks, which correspond to each other, of the color components of the current image, and generate a predicted image made up by the predicted blocks, thereby performing multiple intra prediction. In other words, the multiple mode prediction image generation portion 242 may predict blocks making up the current image from adjacent pixels in the restored image generated by the restored image generation unit 250 using different prediction directions for the blocks of each color component, which are divided to different sizes from the macro blocks, which correspond to each other, of the color components of the current image and generate the predicted image made up by the predicted blocks.

Figure 12:
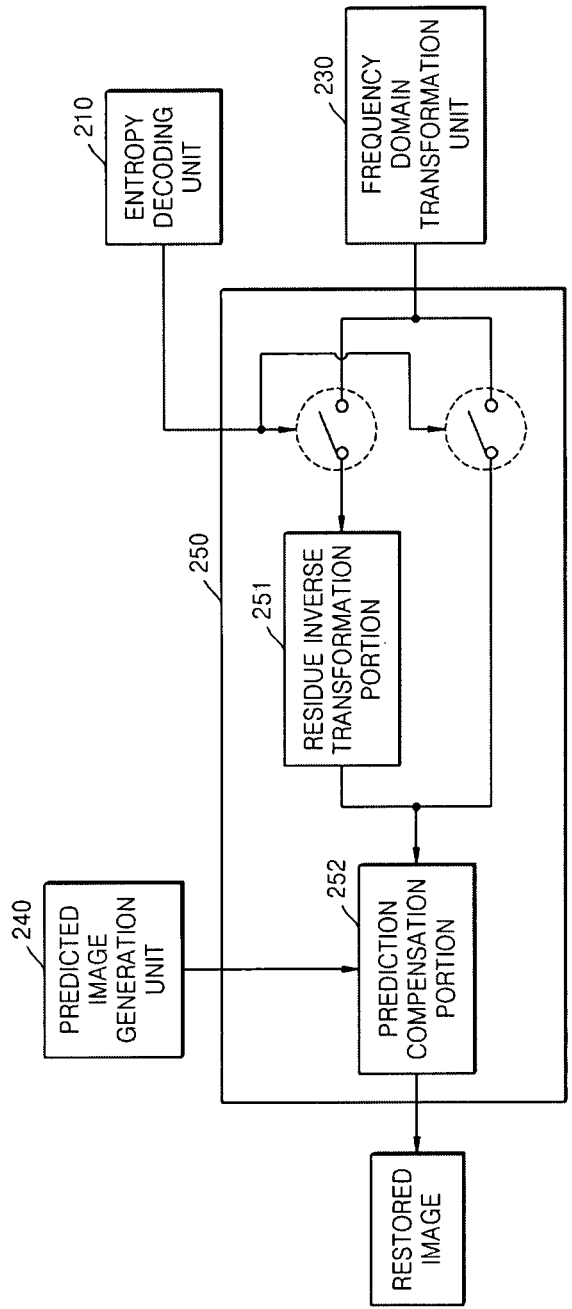
FIG. 12 illustrates a restored image generation unit, such as that illustrated in FIG. 10, according to an embodiment of the present invention.

FIG. 12 illustrates a restored image generation unit 250, such as that shown in FIG. 10, according to an embodiment of the present invention.

Referring to FIG. 12, the restored image generation unit 250 may include a residue inverse transformation portion 251 and a prediction compensation portion 252, for example.

If the information restored by the entropy decoding unit 210 represents the residue transformation mode was applied in the encoding, the residue inverse transformation portion 251 may generate first residues that correspond to the sums of the second residues restored by the frequency domain inverse transformation unit 230. For example, the residue inverse transformation portion 251 may generate the first residues of the Y component, the Co component, and the Cg component, which correspond to the sums of the second residues of each respective color component, i.e., the Y component, the Co component, and the Cg component, using the above Equation 8, for example. Alternatively, for example, the residue inverse transformation portion 251 may generate the first residues of the R component, the G component, and the B component, which correspond to the sums of the second residues of each respective color component, i.e., the R component, the G component, and the B component, using the above Equation 9, for example.

The prediction compensation portion 252 may generate a restored image that corresponds to the sum of the predicted image generated by the predicted image generation unit 240 and the first residues generated by the residue inverse transformation portion 251. For example, the prediction compensation portion 252 may generate a restored image in the YCoCg color space by calculating the sums of the predicted image of each respective color component, i.e., the Y component, the Co component, and the Cg component, and the first residues generated by the residue inverse transformation portion 251. Alternatively, for example, the prediction compensation portion 252 may generate a restored image in the RGB color space by calculating the sums of the predicted image for each respective color component, i.e., the R component, the G component, and the B component, which is generated by the predicted image generation unit 240, and the first residues generated by the residue inverse transformation portion 251.

Figure 13:
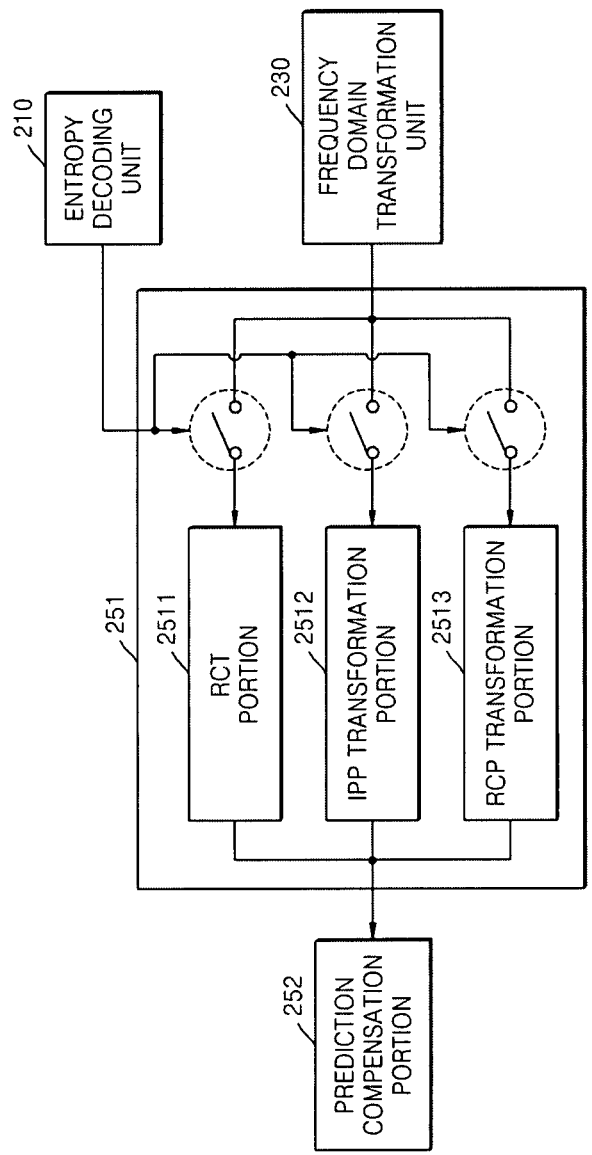
FIG. 13 illustrates a residue inverse transformation portion, such as that illustrated in FIG. 12, according to an embodiment of the present invention.

FIG. 13 illustrates a residue inverse transformation portion 251, such as that shown in FIG. 12, according to an embodiment of the present invention.

Referring to FIG. 13, the residue inverse transformation portion 251 may include an RCT portion 2511, an IPP transformation portion 2512, and an RCP transformation portion 2513, for example.

If the information restored by the entropy decoding unit 210 represents that the RCT transformation mode was applied during the encoding, the RCT portion 2511 may generate the first residues of each of the Y component, the Co component, and the Cg component, which respectively correspond to the sums of the second residues of each of the Y component, Co component, and the Cg component, using the above Equation 8, for example.

If the information restored by the entropy decoding unit 210 represents that the IPP transformation mode was applied during the encoding, the IPP transformation portion 2512 may generate the first residues of each of the R component, the G component, and the B component, which respectively correspond to the sums of the second residues of each of the R component, the G component, and the B component, using the above Equation 9, for example.

If the information restored by the entropy decoding unit 210 represents that the RCP transformation mode was applied during the encoding, the RCP transformation portion 2513 may generate the first residues of each of the R component, the G component, and the B component, which respectively correspond to the sums of the second residues of each of the R component, the G component, and the B component, using the above Equation 9, for example.

Figure 14A:
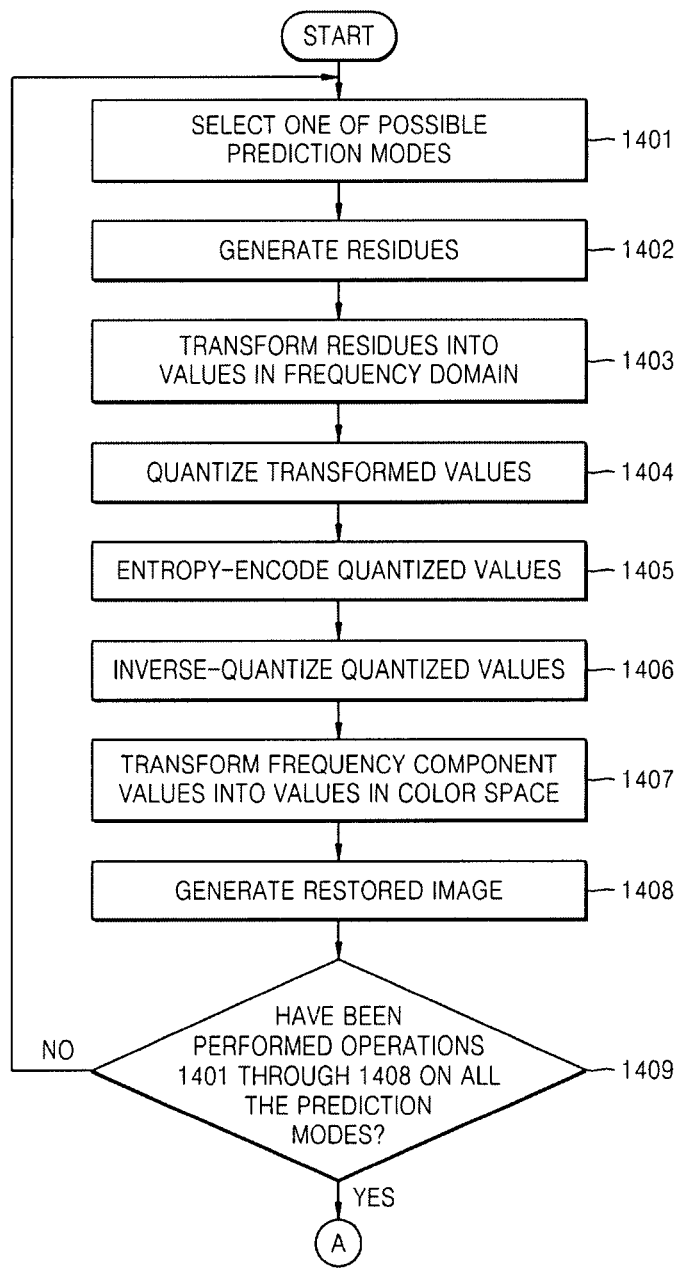
FIGS. 14A and 14B illustrate a moving picture encoding method, according to an embodiment of the present invention.
Figure 14B:
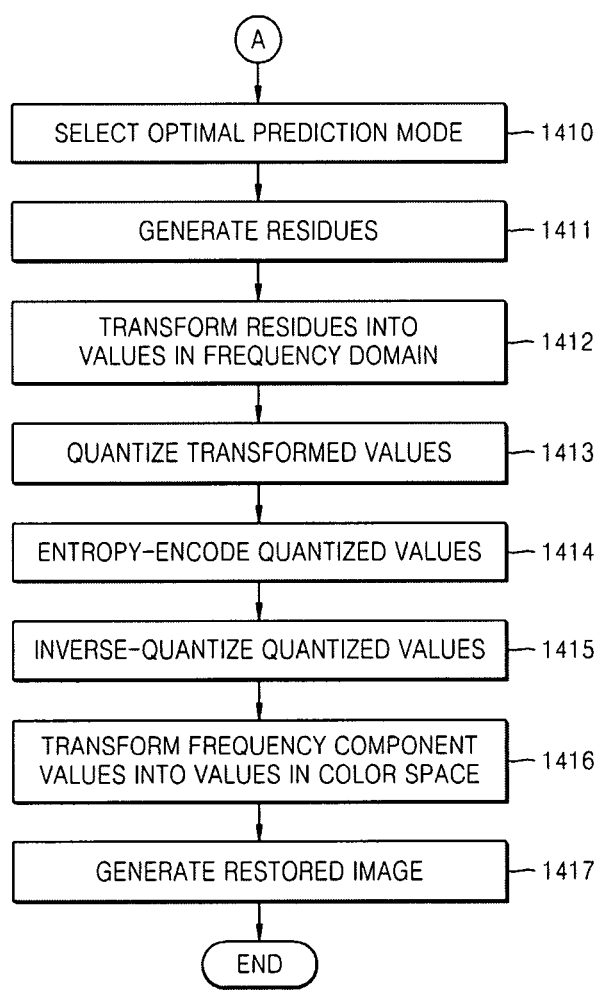

FIGS. 14A and 14B illustrate a moving picture encoding method, according to an embodiment of the present invention.

Referring to FIGS. 14A and 14B, a moving picture encoding method may include operations which may be time-serially performed in the moving picture encoding system shown in FIG. 1, for example. Therefore, for some embodiments of the present invention, the above-descriptions of the moving picture encoding system illustrated in FIG. 1 can also apply to the moving picture encoding method, even if some descriptions thereof are not directly provided below.

In operation 1401, one of the possible prediction modes for a sample image may be selected. As illustrated in FIG. 14A, especially, when operation 1409 returns to operation 1401, one from among possible prediction modes except for a previously selected prediction mode may be selected.

In operation 1402, a predicted image may be generated for the current image for each macro block of each color component, according to the prediction mode selected in operation 1401, and residues that correspond to the differences between the current image and the predicted image may be generated. Alternatively, in operation 1402, a predicted image for the current image for each macro block of each color component may be generated according to the prediction mode selected in operation 1401, and second residues that correspond to the differences between the first residues of the color components may be generated.

In operation 1403, the residues generated in operation 1402 may be transformed, with the residues being color space residues, into values in the frequency domain. Alternatively, in operation 1403, the second residues generated in operation 1402 may be transformed, with the residues being color space residues, into values in the frequency domain.

In operation 1404, the values transformed in operation 1403 may be quantized.

In operation 1405, a bitstream may be generated by entropy-encoding the values quantized in operation 1404 and information representing the prediction mode selected in operation 1401.

In operation 1406, frequency component values may further be restored by inverse-quantizing the values quantized in operation 1404.

In operation 1407, residues that correspond to differences between the current image and the predicted image may be restored by transforming the frequency component values restored in operation 1406, which are frequency domain values, into values in the color space. Alternatively, in an embodiment, in operation 1407, second residues that correspond to differences between the first residues of each color component may be restored by transforming the frequency component values restored in operation 1406, which are frequency domain values, into values in the color space.

In operation 1408, a restored image that corresponds to the sum of the predicted image generated in operation 1402 and the residues restored in operation 1407 may be generated. Alternatively, in an embodiment, in operation 1408, first residues that correspond to the sums of the second residues restored in operation 1407 may be generated, and a restored image that corresponds to the sum of the predicted image generated in operation 1402 and the generated first residues may be generated.

In operation 1409, in one embodiment, whether operations 1401 through 1408 have been performed for all the prediction modes may be determined. In this embodiment, if operations 1401 through 1408 have been performed on all the prediction modes, the method may proceed to operation 1410 illustrated in FIG. 14B. Otherwise, the method may returns to operation 1401.

In operation 1410, an optimal prediction mode may be selected for the macro blocks, which correspond to each other, of the color components of the current image based on the characteristics of the sample images, i.e., the results of operations 1401 through 1409. For example, in operation 1410, the moving picture encoding system may select a prediction mode that leads to a minimum size of a resultant bitstream and/or a minimum amount of quality distortion between the sample image and the restored image generated in operation 1408, as an optimal prediction mode for the macro blocks, which correspond to each other, of the color components of the current image.

In operation 1411, a predicted image for the current image for each macro block of each color component according to the prediction mode selected in operation 1410 may be generated, and residues that correspond to the differences between the current image and the predicted image may be generated. Alternatively, in an embodiment, in operation 1411, a predicted image for the current image for each macro block of each color component may be generated according to the prediction mode selected in operation 1410, first residues that correspond to the differences between the current image and the predicted image may be generated, and second residues that correspond to the differences between the first residues of each color component may be generated.

In operation 1412, the residues generated in operation 1411 may be transformed, with the residues being color space residues, into values in the frequency domain. Alternatively, in operation 1412, the second residues generated in operation 1411 may be transformed, with the residues being color space residues, into values in the frequency domain.

In operation 1413, the values transformed in operation 1412 may be quantized.

In operation 1414, a bitstream may be generated by entropy-encoding the values quantized in operation 1413 and information representing the prediction mode selected in operation 1410.

In operation 1415, the frequency component values may be restored by inverse-quantizing the values quantized in operation 1413.

In operation 1416, residues that correspond to the differences between the current image and the predicted image may be restored by transforming the frequency component values restored in operation 1415, which are frequency domain values, into values in the color space. Alternatively, in an embodiment, in operation 1416, second residues that correspond to differences between the first residues of each color component may be restored by transforming the frequency component values restored in operation 1415, which are frequency domain values, into values in the color space.

In operation 1417, a restored image that corresponds to the sum of the predicted image generated in operation 1411 and the residues restored in operation 1416 may be generated. Alternatively, in an embodiment, in operation 1417, first residues that correspond to the sums of the second residues of each color component restored in operation 1416 may be generated, and a restored image that corresponds to the sum of the predicted image generated in operation 1411 and the generated first residues may be generated.

Figure 15:
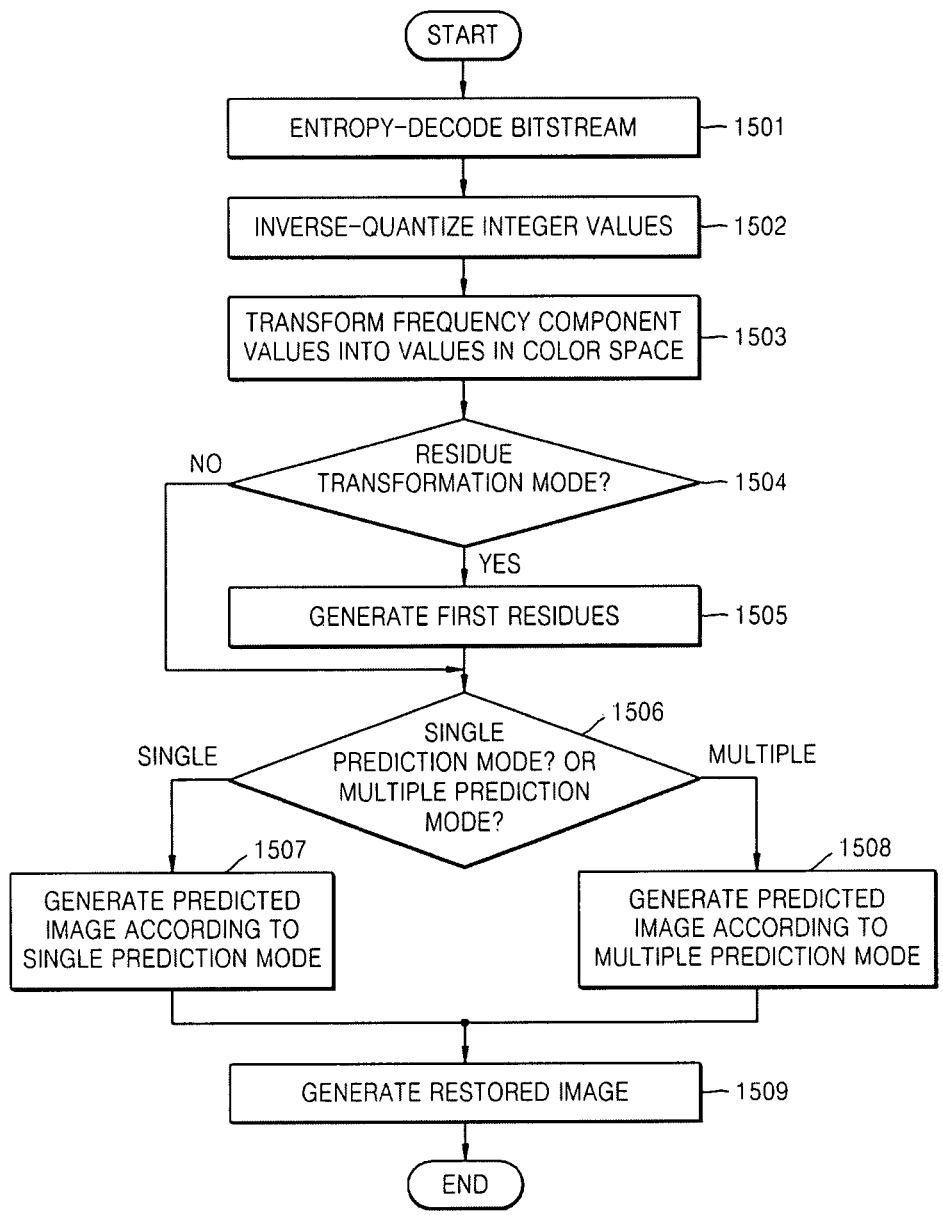
FIG. 15 illustrates a moving picture decoding method, according to an embodiment of the present invention.

FIG. 15 illustrates a moving picture decoding method, according to an embodiment of the present invention.

Referring to FIG. 15, the illustrated operations may be time-serially performed, e.g., such as in the moving picture decoding system shown in FIG. 10. Accordingly, for such an embodiment, the above-descriptions of the moving picture decoding system illustrated in FIG. 10 should also be applied to such a moving picture decoding method, even if some descriptions thereof are not directly provided below.

In operation 1501, integer values corresponding to the current image and information representing the optimal prediction mode for the macro blocks, which correspond to each other, of the color components of the current image may be restored by entropy-decoding a bitstream, such as that output from the moving picture encoding system illustrated in FIG. 1.

In operation 1502, the frequency component values may be restored by inverse-quantizing the integer values restored in operation 1501.

In operation 1503, residues that correspond to the differences between the current image and the predicted image may be generated by transforming the frequency component values restored in operation 1502, which are frequency domain values, into values in the color space. Alternatively, in an embodiment, in operation 1503, second residues that correspond to the differences between the first residues of each color component may be restored by transforming the frequency component values restored in operation 1502, which are frequency domain values, into values in the color space.

In operation 1504, if the information restored in operation 1501 represents that the residue transformation mode was applied during encoding, the below operation 1505 may be performed. Otherwise, the below operation 1506 may be performed.

In operation 1505, first residues that correspond to the sums of the second residues of each color component restored in operation 1503 may be generated. In particular, if the information restored in operation 1501 represents that the RCT transformation mode was applied during encoding, in operation 1505, the first residues of each of the Y component, the Co component, and the Cg component, which respectively correspond to the sums of the second residues of each of the Y component, the Co component, and the Cg component, may be generated using the above Equation 8, for example. Alternatively, if the information restored in operation 1501 represents that the IPP or RCP transformation modes were applied in encoding, in operation 1505, the first residues of each of the R component, the G component, and the B component, which respectively correspond to the sums of the second residues of each of the R component, the G component, and the B component, may be generated using the above Equation 9, for example.

In an embodiment, if the information restored by the entropy decoding unit 210 represents that the RCP transformation mode was applied in encoding, the RCP transformation portion 2511 may generate the first residues of each of the R component, the G component, and the B component, which respectively correspond to the sums of the second residues of each of the R component, the G component, and the B component, using the above Equation 9, for example.

In operation 1506, if the information restored in operation 1501 is determined to represent the single prediction mode, operation 1507 may be performed. If the information restored in operation 1501 is determined to represent the multiple prediction mode, operation 1508 may be performed.

In operation 1507, a predicted image may be generated according to the single prediction mode, i.e., using motion vectors that are commonly applied to all the divided blocks of the color components of the current image, which are divided equally, or using prediction directions that are independently applied to all the divided blocks of the color components.

In operation 1508, a predicted image may be generated according to the multiple prediction mode, i.e., using motion vectors that are independently applied to the divided blocks of each color component of the current image, which are divided into blocks of different sizes, or using prediction directions that are independently applied to the divided blocks of each color component.

In operation 1509, a restored image that corresponds to the sum of the predicted image generated in operation 1507 or 1508 and the residues restored in operation 1503 may be generated. Alternatively, a restored image that corresponds to the sum of the predicted image generated in operation 1507 or 1508 and the first residues generated in operation 1505 may be generated.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention, encoding and/or decoding of moving pictures may be performed by adaptively applying an optimal prediction mode to corresponding macro blocks, which correspond to each other, of the color components of a current image for each macro block, so that encoding and/or decoding efficiencies increase. In particular, various encoding methods, such as a single prediction mode, a multiple prediction mode, inter prediction, intra prediction, residue transformation, RCT, IPP transformation, RCP transformation, etc., may be selectively used to encode each color component of the current image for each macro block, thereby maximizing encoding and decoding efficiencies.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A decoding apparatus, comprising:
    a predicted image generation unit to obtain a prediction mode by decoding a bitstream, to obtain an intra luma prediction direction of a luma component of a current block when the obtained prediction mode is an intra prediction mode, and to obtain an intra chroma prediction direction of a chroma component corresponding to the intra luma prediction direction of the luma component of the current block according to one of a plurality of predetermined modes based on information included in the bitstream which indicates that the intra chroma prediction direction of the chroma component is identical to the intra luma prediction direction of the luma component, and to obtain a predicted block using a spatially adjacent pixel,
    wherein the spatially adjacent pixel is determined according to the intra chroma prediction direction of the chroma component, and
    wherein the intra chroma prediction direction of the chroma component is identical to the intra luma prediction direction of the luma component; and a restored image generation unit to obtain residue by decoding the bitstream, and to obtain a restored image using the obtained residue and the obtained predicted block, wherein the intra chroma prediction direction of the luma component is decoded from the bitstream at a block level.

* * * * *